US008867394B2

(12) United States Patent
Seok et al.

(10) Patent No.: US 8,867,394 B2
(45) Date of Patent: Oct. 21, 2014

(54) INTERFERENCE AVOIDANCE METHOD AND APPARATUS FOR SUPPORTING SAME IN A WIRELESS LAN SYSTEM

(75) Inventors: Yong Ho Seok, Anyang-si (KR); Yu Jin Noh, Anyang-si (KR); Bong Hoe Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 13/517,951

(22) PCT Filed: Nov. 4, 2010

(86) PCT No.: PCT/KR2010/007751
§ 371 (c)(1),
(2), (4) Date: Jun. 20, 2012

(87) PCT Pub. No.: WO2011/083905
PCT Pub. Date: Jul. 14, 2011

(65) Prior Publication Data
US 2012/0275332 A1    Nov. 1, 2012

Related U.S. Application Data

(60) Provisional application No. 61/293,159, filed on Jan. 7, 2010.

(51) Int. Cl.
*G01R 31/08* (2006.01)
*H04B 7/04* (2006.01)
*H04L 5/00* (2006.01)
*H04W 16/28* (2009.01)
*H04L 25/02* (2006.01)

(52) U.S. Cl.
CPC ........... *H04B 7/0452* (2013.01); *H04L 5/0023* (2013.01); *H04W 16/28* (2013.01); *H04L 5/0091* (2013.01); *H04L 25/0224* (2013.01); *H04L 25/0204* (2013.01)
USPC ........................... 370/252; 370/254; 370/330

(58) Field of Classification Search
CPC .............. H04L 5/006; H04L 25/02246; H04L 25/02266; H04W 16/28; H04W 16/06; H04W 84/126; H04W 99/00
See application file for complete search history.

(56) References Cited

U.S. PATENT DOCUMENTS

| 2006/0067258 | A1 | 3/2006 | Golestani et al. |
| 2007/0286303 | A1 | 12/2007 | Yamaura |
| 2007/0298742 | A1* | 12/2007 | Ketchum et al. ........... 455/186.1 |
| 2008/0014870 | A1 | 1/2008 | Kim |
| 2009/0080504 | A1* | 3/2009 | Li et al. ......................... 375/220 |
| 2011/0261708 | A1* | 10/2011 | Grandhi ....................... 370/252 |

* cited by examiner

*Primary Examiner* — David Oveissi
(74) *Attorney, Agent, or Firm* — Lee, Hong, Degerman, Kang & Waimey

(57) ABSTRACT

An interference avoidance method performed by an access point (AP) in a wireless local area network (WLAN) system is provided. The method includes: transmitting a training request (TRQ) message for requesting transmission of a sounding frame to a first station which is a target of multi-user multiple input multiple output (MU-MIMO) transmission and a second station which receives data through a direct link during the MU-MIMO transmission; receiving first and second sounding frames respectively transmitted by the first and second stations in response to the TRQ message; estimating a channel by using the first sound frame to determine a beam-forming vector to be used for the MU-MIMO transmission; and performing the MU-MIMO transmission for MU-MIMO transmission target stations including the first station, wherein the beam-forming vector is determined such that the MU-MIMO transmission has a minimum effect on the second station by considering channel information between the AP and the second station and acquired on the basis of the second sounding frame received from the second station.

7 Claims, 22 Drawing Sheets

INTERFERENCE AVOIDANCE METHOD AND APPARATUS FOR SUPPORTING SAME IN A WIRELESS LAN SYSTEM

CROSS-REFERENCE TO RELATED APPLICATIONS

This application is the National Stage filing under 35 U.S.C. 371 of International Application No. PCT/KR2010/007751, filed on Nov. 4, 2010, which claims the benefit of U.S. Provisional Application Serial No. 61/293,159, filed on Jan. 7, 2010, the contents of which are all incorporated by reference herein in their entirety.

TECHNICAL FIELD

The present invention relates to wireless communications, and more particularly, to an interference avoidance method in a wireless local area network (WLAN) system and an apparatus for supporting the method.

BACKGROUND ART

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802 (i.e., the standardization organization of WLAN technology) was established on February, 1980. WLAN technology initially supported a speed of 1 to 2 Mbps through frequency hopping, band spreading, and infrared communication by using a frequency of 2.4 GHz according to IEEE 802.11, but recently may support a maximum speed of 54 Mbps by using Orthogonal Frequency Division Multiplexing (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or developed. Furthermore, in order to overcome a limit to the communication speed that was considered as being weakness in the WLAN, IEEE 802.11n has recently been established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver. Furthermore, this standard may use not only a coding scheme for transmitting several redundant copies in order to increase data reliability, but also Orthogonal Frequency Division Multiplex (OFDM) in order to increase the speed.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of 1 Gbps or higher. This is because the IEEE 802.11n MAC/PHY protocol is designed for an operation of a single station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of 1 Gbps or higher in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of 1 Gbps or higher in a MAC service access point (SAP).

The VHT WLAN system allows simultaneous channel access of a plurality of VHT STAs for the effective use of a radio channel. For this, multi-user multiple input multiple output (MU-MIMO)-based transmission using multiple antennas is supported. A VHT access point (AP) can perform spatial division multiple access (SDAM) transmission which concurrently transmits spatial-multiplexed data to a plurality of VHT STAs. When data is concurrently transmitted by distributing a plurality of spatial streams to the plurality of STAs through a plurality of antennas, an overall throughput of the WLAN system can be increased.

Meanwhile, the IEEE 802.11e standard supports a direct link setup (DLS) service for directly transmitting data between STAs without the aid of an AP. The DLS service sets up a direct link (DL) between a DLS initiating STA (i.e., a DLS initiator) and a DLS responding STA (i.e., a DLS responder), and thereafter directly transmits/receives a data frame through the DL. Details of the DLS service may be found in the section 7.4.3 and the section 10.3.25 of IEEE Standard for Information technology—Telecommunications and information exchange between systems—Local and metropolitan area networks—Specific requirements, Part 11: Wireless LAN Medium Access Control (MAC) and Physical Layer (PHY) Specifications' introduced in June, 2007.

In order to more effectively use a radio resource in a WLAN system supporting MU-MIMO, it is possible to consider a method of simultaneously performing data by using a DLS service between STAs which are not targets of MU-MIMO transmission while MU-MIMO transmission is achieved between an AP and a plurality of STAs. In this case, MU-MIMO transmission of the AP may act as interference to an STA which receives data by using the DLS service. This causes decrease in data transmission reliability, and impairs effective utilization of a radio resource, thereby decreasing an overall throughput of the WLAN system. Accordingly, there is a need to consider a method of avoiding mutual interference when MU-MIMO transmission and data transmission using the DLS service are simultaneously performed.

SUMMARY OF INVENTION

Technical Problem

The present invention provides a method for avoiding mutual interferences in a wireless local area network (WLAN) system in which multi-user multiple input multiple output (MU-MIMO) transmission and data transmission using a direct link setup (DLS) service are simultaneously achieved and an apparatus for supporting the method.

Technical Solution

In an aspect, an interference avoidance method performed by an access point (AP) in a wireless local area network (WLAN) system is provided. The method includes: transmitting a training request (TRQ) message for requesting transmission of a sounding frame to a first station which is a target of multi-user multiple input multiple output (MU-MIMO) transmission and a second station which receives data through a direct link during the MU-MIMO transmission; receiving first and second sounding frames respectively transmitted by the first and second stations in response to the TRQ message; estimating a channel by using the first sound frame to determine a beam-forming vector to be used for the MU-MIMO transmission; and performing the MU-MIMO transmission for MU-MIMO transmission target stations including the first station, wherein the beam-forming vector is determined such that the MU-MIMO transmission has a minimum effect on the second station by considering channel information between the AP and the second station and acquired on the basis of the second sounding frame received from the second station.

The second sounding frame may be a steered sounding frame which is precoded with a receiving matrix acquired by the second station by using a third sounding frame received from a third station for transmitting data to the second station through a direct link.

The third sounding frame may include channel information between the third station and the first station.

The first sounding frame may include channel information between the third station and the first station.

The second station may transmit channel information between the second station and a third station for transmitting data to the second station through the direct link together with the second sounding frame as quantized data.

The channel information transmitted with the quantized data may be acquired on the basis of a receiving matrix acquired by using a third sounding frame received from the third station.

In another aspect, an interference avoidance method performed by an access point (AP) in a wireless local area network (WLAN) system is provided. The method includes: transmitting a training request (TRQ) message for requesting transmission of a sounding frame to a first station which is a target of multi-user multiple input multiple output (MU-MIMO) transmission, a second station which receives data through a direct link during the MU-MIMO transmission, and a third station which transmits data through a direct link; receiving first and second sounding frames respectively transmitted by the first and second stations in response to the TRQ message; receiving from the third station a sounding frame and a multi-user direct link setup (MU DLS) frame including a station identifier (STA ID) field indicating a transmitting station which transmits data by the third station to the second station through the direct link; estimating a channel by using the first sound frame to determine a beam-forming vector to be used for the MU-MIMO transmission; and performing the MU-MIMO transmission for MU-MIMO transmission target stations, wherein the beam-forming vector is determined such that the MU-MIMO transmission has a minimum effect on the second station by considering channel information between the AP and the second station and acquired on the basis of the second sounding frame received from the second station.

The MU DLS frame may further include at least one of a multi-TID field indicating quality of service (QoS) information of data transmitted by the third station to the second station, a start offset field indicating a time at which the third station starts to transmit the data to the second station through the direct link, and a duration field indicating a duration in which the third station transmits the data to the second station through the direct link.

The second sounding frame may be a steered sounding frame which is precoded with a receiving matrix acquired by the second station by using a third sounding frame received from the third station for transmitting data to the second station through the direct link.

The third sounding frame may include channel information between the third station and the first station.

The first sounding frame may include channel information between the third station and the first station.

The method of claim 6,

The second station may transmit channel information between the second station and the third station for transmitting data to the second station through the direct link together with the second sounding frame as quantized data.

Advantageous Effects

Multi-user multiple input multiple output (MU-MIMO) transmission which may act as mutual interference and data transmission based a direct link setup (DLS) service can be simultaneously achieved. Accordingly, data transmission reliability can be ensured, and an overall throughput of a wireless local area network (WLAN) system can be improved.

MODE FOR INVENTION

Hereinafter, embodiments of the present invention will be described with reference to the accompanying drawings. The embodiments of the present invention described below can be effectively applied to a very high throughput (VHT) wireless local area network (WLAN) system supporting multi user multiple input multiple output (MU-MIMO). Although the VHT WLAN system will be described hereinafter for example, the technical features of the present invention are not limited thereto. The interference avoidance method proposed in the present invention can also equally apply to a case where data transmission based on a direct link setup (DLS) service (hereinafter, direct link transmission) and another direct link transmission are simultaneously achieved. The direct link transmission is an example of communication between stations, and can equally apply to a Wi-Fi direct service in addition to a DLS service of IEEE 802.11 and direct communication between stations.

The interference avoidance method proposed in the present invention is equally applicable to a WLAN system operating at a 512-698 MHz frequency band (TV white space), a 2.5 GHz frequency band (2.4-2.4835 GHz, low band (LB)), a 5 GHz frequency band (4.9-5.825 GHz, hing band (HB)), and a 60 GHz frequency band (57-66 GHz, ultra band (UB)).

Figure 1:
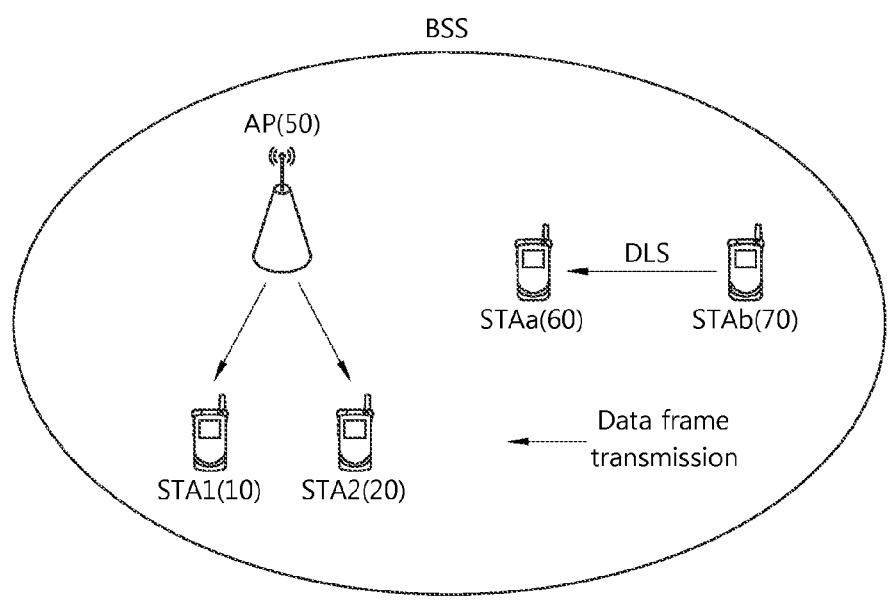
FIG. 1 is a schematic view showing an exemplary structure of a wireless local area network (WLAN) system to which an embodiment of the present invention is applicable.

FIG. 1 is a schematic view showing an exemplary structure of a WLAN system to which an embodiment of the present invention is applicable.

Referring to FIG. 1, the WLAN system includes one or more basic service sets (BSSs). The BSS is a set of stations (STAs) which are successfully synchronized to communicate with one another, and is not a concept indicating a specific region.

The BSS can be classified into an infrastructure BSS, an independent BSS (IBSS), and a personal BSS (PBSS). The infrastructure BSS is shown in FIG. 1.

Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The PBSS is one type of IEEE 802.11 LAN ad hoc networks similar to the IBSS. STAs of the PBSS are directly connected to each other and thus communication is possible between the STAs. However, unlike the IBSS, there is a PBSS control point (PCP) which takes a role of a coordinator. The PCP is an STA which takes a role of a coordinator in the PBSS. The PCP serves to transmit a beacon frame without the aid of other elements, and allocates a service duration and a contention-based duration.

The STA is an arbitrary functional medium including a medium access control (MAC) and wireless-medium physical layer interface conforming to the institute of electrical and electronics engineers (IEEE) 802.11 standard, and includes both an AP, a PCP, a non-AP STA, and a non-PCP STA in a broad sense. An STA including a transceiver operating at a 60 MHz band is called a millimeter wave STA (i.e., mmWave STA or mSTA).

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is operatively connected to the processor and is a unit devised to transmit and receive a frame for the STAs through the wireless network.

Among the STAs, non-AP/non-PCP STAs are portable terminals operated by users. A non-AP/non-PCP STA may be simply referred to as a wireless transmit/receive unit (WTRU), a user equipment (UE), a mobile station (MS), a mobile terminal, a mobile subscriber unit, etc. In the following description, the STA implies the non-AP/non-PCP STA unless specified otherwise.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, the AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

FIG. 1 shows an example in which an AP simultaneously performs data frame transmission through downlink MU-MIMO transmission for an STA1 10 and an STA2 20 and direct link transmission for an STAb 70 and an STAa 60. That is, this is an exemplary case where MU-MIMO transmission and direct link transmission are simultaneously achieved in an infrastructure BSS. This is only for an example of a WLAN system to which the present invention is applicable, and thus the present invention is also equally applicable to an STA operating in the PBSS. If it is also applied to the PBSS, the AP of FIG. 1 may be a PBSS control point (PCP). In the following embodiments, it is assumed that the AP 50 performs MU-MIMO transmission for the STA1 10 and the STA2 20, and the STAb 70 performs direct link transmission for the STAa 50.

In the example of FIG. 1 and in each of the following embodiments, a situation is assumed in which a DLS service between the STAa 60 and the STAb 70 has been initiated. The initiating of the DLS service between the STAa 60 and the STAb 70 is achieved by exchanging a DLS request frame and a DLS response frame. Details of formats of the DLS request frame and the DLS response frame and a process of exchanging the frames may be found in the section 7.4.3 and the section 10.3.25 of 'IEEE Standard for Information technology—Telecommunications and information exchange between systems—Local and metropolitan area networks—Specific requirements, Part 11: Wireless LAN Medium Access Control (MAC) and Physical Layer (PHY) Specifications'.

In a situation where data is transmitted to the STAa 60 by the STAb 70 through a directly link while the AP 50 performs downlink MU-MIMO transmission for the STA1 10 and STA2 20, MU-MIMO transmission of the AP 50 for the STA1 10 and STA2 20 acts as interference when receiving data transmitted by the STAb 70 from the perspective of the STAa 60. When performing MU-MIMO transmission, the AP 50 must form a beam by considering STAs (i.e., the STAa 60 and the STAb 70) which transmit a data frame through the direct link. In this case, data transmission of the STAb 70 performing direct link transmission may be achieved in a form of directional transmission or omni-directional transmission. That is, in the following embodiments of the present invention, transmission of the STAb 70 which performs the direct link transmission may have any one of the directional transmission and the omni-directional transmission.

The present invention proposes a method in which the STAa 60 can avoid interference caused by MU-MIMO transmission performed by the AP 50 for the STA1 10 and STA2 20 in the above situation.

Figure 2:
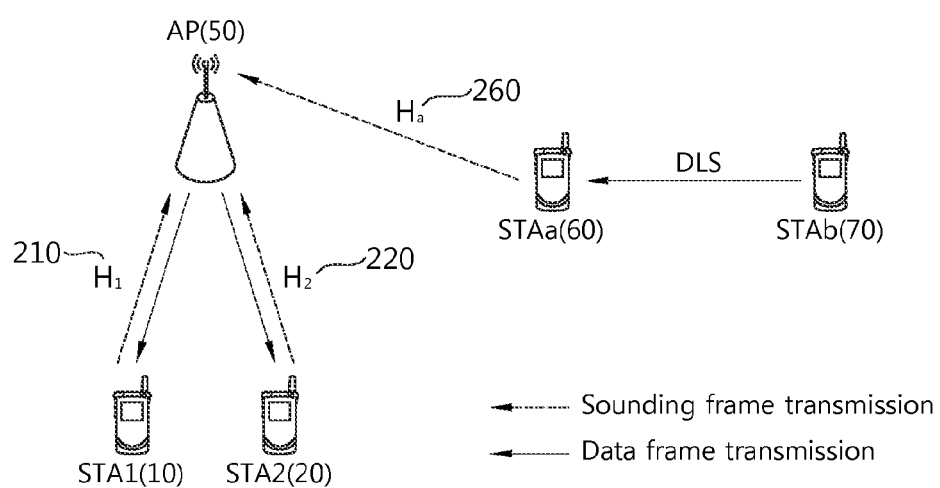
FIG. 2 to FIG. 5 are schematic views showing an interference avoidance method according to a first embodiment of the present invention.

FIG. 2 is a schematic view showing an interference avoidance method according to an embodiment of the present invention.

An AP 50 acquires channel information $H_1$ 210 and channel information $H_2$ 220 from transmission targets, i.e., an STA1 10 and an STA2 20. Herein, the channel information $H_1$ 210 is channel information between the AP 50 and the STA1 10, and the channel information $H_2$ 220 is channel information between the AP 50 and the STA2 20. In addition, channel information $H_a$ 260 between the AP 50 and the STAa is acquired from the STAa 60. The AP 50 can receive a channel matrix transmitted as data from the STA1 10, the STA2 20, and the STAa 60 by using the channel information $H_1$ 210, $H_2$ 220, and $H_a$ 260, respectively, or can receive a sounding frame to estimate a channel, and thus can acquire channel information. Hereinafter, if the STA or the AP acquires channel information by receiving a sounding frame or a steered sounding frame, it implies that a channel matrix is acquired by performing channel estimation by the use of the sounding frame or the steered sounding frame.

The example of FIG. 2 shows an example in which the AP 50 acquires channel information by receiving the sounding frame. In this case, the channel information $H_1$ 210, $H_2$ 220, and $H_a$ 260 may be a channel matrix of a corresponding channel acquired through channel estimation by receiving the sounding frame received by the AP 50. The AP 50 may perform transmission by forming a beam such that MU-MIMO transmission to the STA1 10 and the STA2 20 does not act as interference to the STAa 60 on the basis of the acquired channel information.

Figure 3:
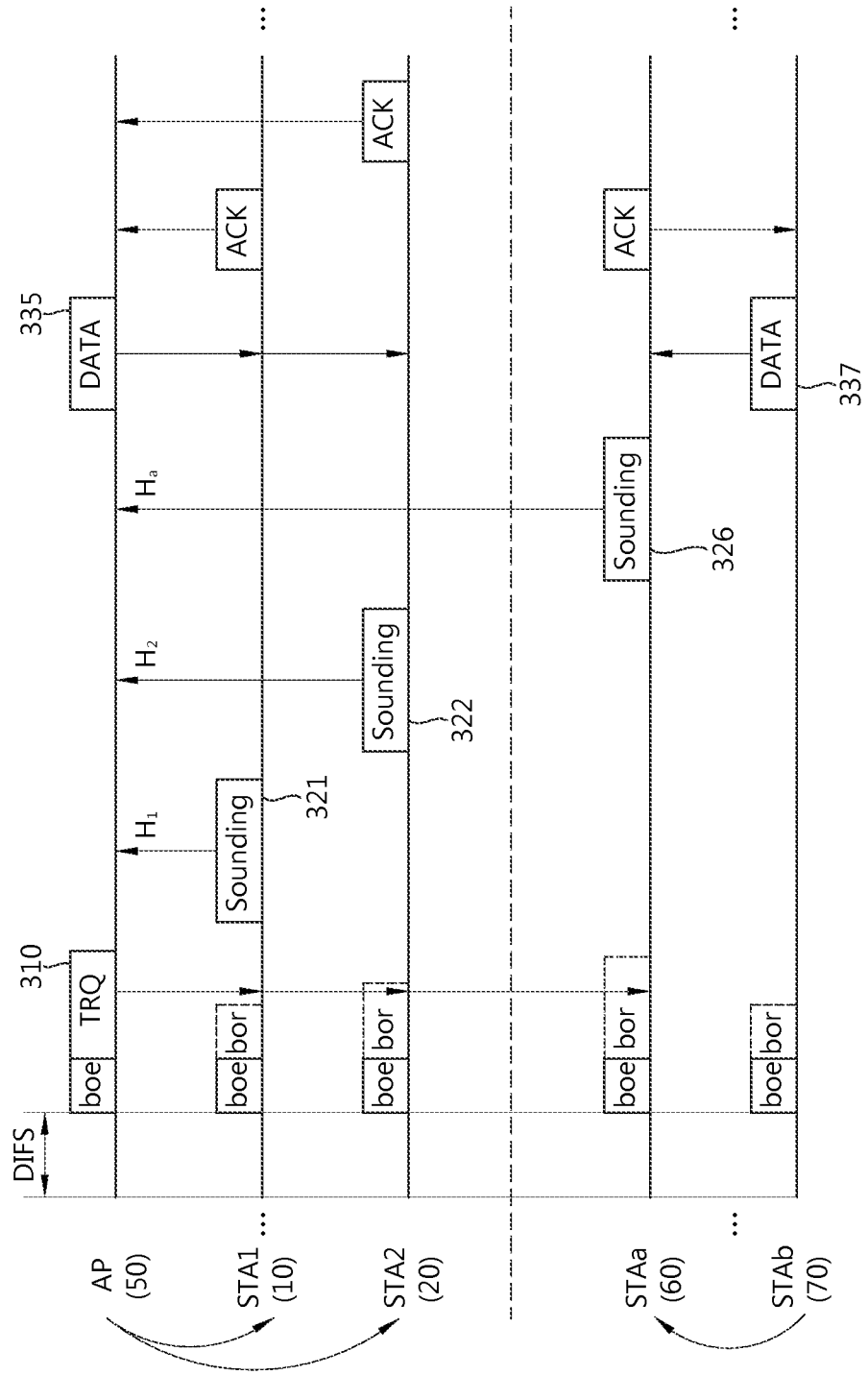

FIG. 3 is a diagram showing an interference avoidance method according to an embodiment of the present invention. An example of FIG. 3 is a case where an AP 50 knows that an STAb 70 performs direct link transmission to an STAa 60.

In the IEEE 802.11 WLAN standard, when a channel is idle after waiting for at least a distributed interframe space (DIFS) before accessing the channel in a contention period, an STA of which a backoff timer expires first uses the channel by accessing the channel through a random backoff process. FIG. 3 shows a case where the AP 50 uses the channel since a backoff timer is expired first (indicated by 'boe' in the figure). Illustration regarding an access delay during a DIFS period for a contention-based operation, an SIFS between frame transmission and ACK transmission thereon, or the like will be omitted in the following embodiments as well as in the example of FIG. 3.

In the example of FIG. 3, the AP 50 first accesses the channel and initiates an interference avoidance process according to the present invention by transmitting a training request (TRQ) message 310. The TRQ message 310 requests a receiving STA to transmit a sounding frame to estimate a channel for MU-MIMO transmission and also reports the initiation of the interference avoidance process according to the present invention. The TRQ message 310 may include information indicating a target STA for transmitting the sounding frame and information indicating an order when the target STA transmits the sounding frame in response to the TRQ message 310. In this case, as the STA for transmitting the sounding frame, the AP 50 configures the TRQ message 50 by further including an STA (i.e., the STAa 60 in the example of FIG. 3) for receiving data by using a DLS service in addition to the STA (i.e., the STA1 10 and STA2 20 in the example of FIG. 3) which is a target of MU-MIMO transmission. That is, in the example of FIG. 3, the TRQ message 310 includes information indicating that the STA1 10, the STA2 20, and the STAa 60 are transmission target STAs.

Upon receiving the TRQ message 310, the STA1 10, the STA2 20, and the STAa 60 respectively transmit sounding frames 321, 322, and 326 in response to the TRQ message 310.

Upon receiving the sounding frame 321 from the STA1 10, the AP 50 can estimate a channel with the STA1 10 by using the sounding frame 321 and acquire a channel matrix $H_1$ as channel information. Likewise, channel matrices $H_2$ and $H_a$ are acquired. The AP 10 forms a beam for MU-MIMO transmission on the basis of the acquired channel information $H_1$ and $H_2$. In this case, the AP 10 steers MU-MIMO transmission not to act as interference to the STAa 60 (i.e., determines a beamforming vector) by considering the acquired channel information $H_a$ with the STAa.

Thereafter, the AP 50 transmits data 335 through MU-MIMO transmission by forming a beam steered not to act as interference (or to minimize interference) to the STAa 60, and receives data 337 transmitted by the STAb 70 through a direct link.

That is, the STAa 60 which receives data by using a DLS service transmits a sounding frame to the AP 50 which transmits a data frame through MU-MIMO transmission so that the AP 50 can acquire channel information between the STAa 60 and the AP 50 through channel estimation. By using the acquired channel information in the beamforming process for MU-MIMO transmission, the AP 50 prevents (or avoids) MU-MIMO transmission from acting as interference to the STAa 60 for receiving data through the direct link.

Figure 4:
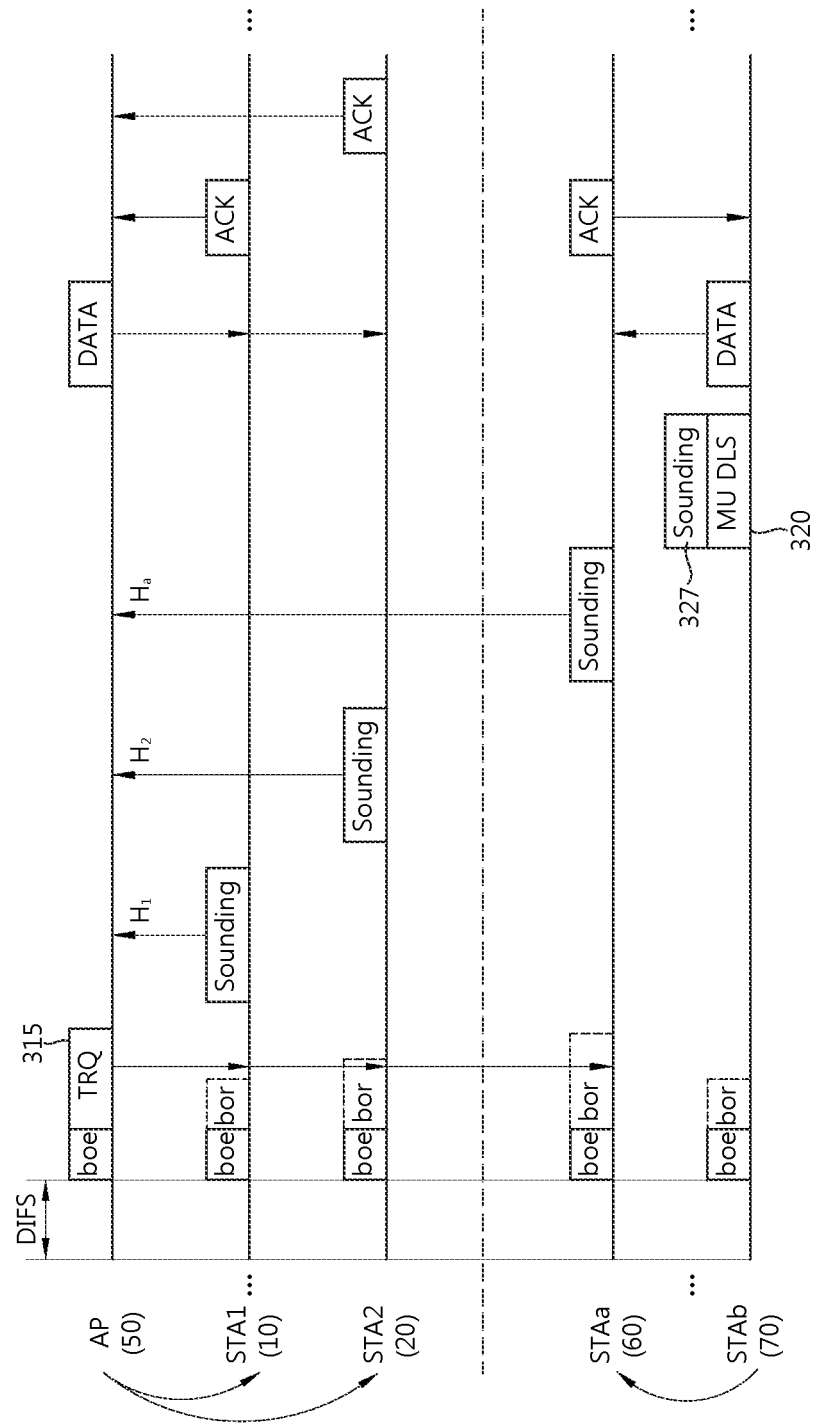

FIG. 4 is a diagram showing an interference avoidance method according to another embodiment of the present invention.

An example of FIG. 4 is a case where an AP 50 knows that an STAa 60 and an STAb 70 set up a direct link and transmit/receive data through the direct link, but does not know which STA is a data transmitting STA and which STA is a data receiving STA.

The following description on the embodiment of FIG. 4 will focus on a difference to the embodiment of FIG. 3. Unlike the case of FIG. 3 in which the AP 50 knows that an STA for receiving data through the direct link is the STAa 60, the embodiment of FIG. 4 is a case where the AP 50 does not know which STA between the STAa 60 and the STAb 70 is an STA for receiving data. Therefore, unlike the case of FIG. 3, the AP 50 transmits a TRQ message 315 not only to the STAa 60 but also to the STAb 70 to request sounding frame transmission.

Upon receiving the TRQ message 315, the STAb 70 transmits a sounding frame 327 in response thereto. In this case, the STAb 70 transmits a message to report that the STAb 70 itself is an STA for transmitting data to the STAa 60 through the direct link. The message for reporting to the AP 50 that the STAb 70 is a transmitting STA in data transmission/reception by using a DLS service can be transmitted as a separate frame (i.e., a MI DLS frame) or can be transmitted by being included in a sounding frame as an information element. That is, in the example of FIG. 4, the STAa 60 can transmit a MU DLS frame 320 subsequently to the sounding frame 327 or can transmit the MU DLS frame 320 by including it into the sounding frame 327 as an information element. The same is also applied in the following embodiments. A MU DLS information element can include information regarding a presence/absence of data and a data transmission direction between STAs for transmitting/receiving data through the direct link.

Table 1 is an example of a body of the MU DLS frame proposed in the present invention.

TABLE 1

| Order | Information |
|---|---|
| 1 | Category |
| 2 | Action |
| 3 | Multi User DLS Info |

The category field and the action field briefly indicate contents of a category and action of a corresponding frame. That is, it can indicate that the corresponding frame relates to a MU DLS service in which direct link transmission is simultaneously achieved while MU-MIMO transmission is performed, and is a control signal for providing associated information/parameters.

A multi-user (MU) DLS information (DLS info) field may include a MU DLS information element. The MU DLS information element may consist of the following information of Table 2.

TABLE 2

| Order | Information |
|---|---|
| 1 | Multi-TID |
| 2 | Start Offset |
| 3 | Duration |
| 4 | STA-ID |

Information of the MU DLS information element of Table 2 will be described in association with the example of FIG. 1. The multi-TID field includes QoS information of data transmitted by the STAb 70 to the STAa 60. The start offset field indicates a time at which the STAb 70 starts to transmit data to the STAa 60. The duration field indicates information regarding a specific duration in which the STAb 70 for transmitting data through the direct link transmits the data to the STAa 60 for receiving the data.

The STA-ID field indicates information regarding which STA transmits data through the direct link. In the example of FIG. 3, the STA for transmitting the data through the direct link is the STAb 70, and thus the STA-ID field contains information indicating the STAb 70, such as a MAC address or association ID (AID) of the STAb 70.

The AP 50 can receive the MU DLS information element from the STAb 70 so that the STAb 70 transmits data to the STAa 60 through the direct link. The AP 50 acquires information on a channel with the STAb 60 by using a sounding frame received from the STAb 60 for receiving data through the direct link, forms a beam to have a less effect on the STAb 60, and transmits data to the STA1 10 and the STA2 20 through MU-MIMO transmission.

Figure 5:
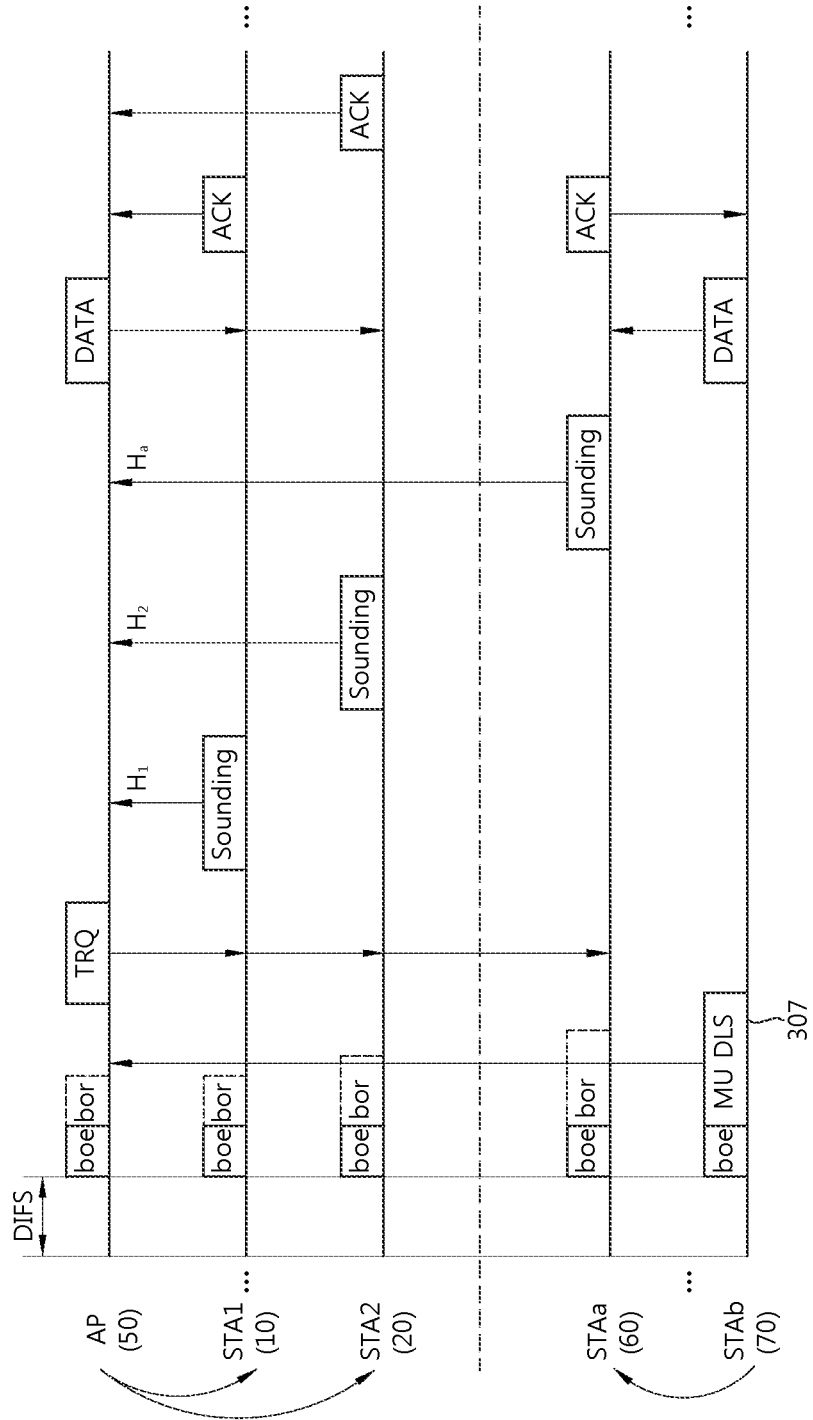

FIG. 5 is a diagram showing an interference avoidance method according to another embodiment of the present invention.

Similarly to the case of FIG. 4, a case where the AP 50 does not know which STA is an STA for transmitting data through a direct link and which STA is an STA for receiving data is shown in FIG. 5. However, the interference avoidance process proposed in the present invention is initiated by the AP 50 in the case of FIG. 4, whereas the process is initiated by the STAb 70 for transmitting data through the direct link in FIG. 5. In other words, the interference avoidance process proposed in the present invention can also be initiated by an STA, in addition to a case where it is initiated by the AP 50 as shown in the examples of FIG. 3 and FIG. 4.

A difference to the case of FIG. 4 primarily lies in that the interference avoidance process according to the embodiment of the present invention can start by transmitting a frame 307 including a MU DLS information element to the AP 50 by the STAb 70 for transmitting data through the direct link or the STAa 60 for receiving data through the direct link. The example of FIG. 5 shows that the process is initiated when the STAb 70 transmits the MU DLS information element.

In the example of FIG. 5, the AP 50 receives the MU DLS information element from the STAb 70 and thus knows that the STAa 60 is an STA which receives data through the direct link. The subsequent steps are the same as those of FIG. 3.

Figure 6:
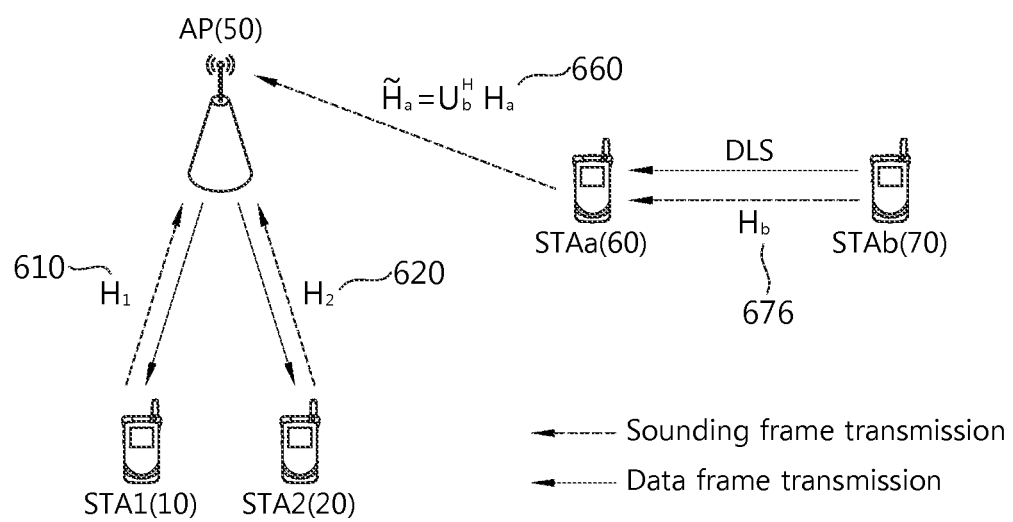
FIG. 6 to FIG. 9 are schematic views showing an interference avoidance method according to a second embodiment of the present invention.

FIG. 6 is a schematic view of an interference avoidance method according to another embodiment of the present invention.

Similarly to the case of FIG. 2, an AP 50 acquires channel information $H_1$ 610 and channel information $H_2$ 620 from transmission targets, i.e., an STA1 10 and an STA2 20. Further, the AP 50 acquires channel information $\tilde{H}_a$ 660 from an STAa 60. In this case, unlike the case of FIG. 2, the channel information $\tilde{H}_a$ 660 is channel information determined by considering channel information $H_b$ 676 between the STAb 70 and the STAa 60 and acquired by the STAa 60 by using a sounding frame received from the STAb 70.

Unlike the case of FIG. 2, the AP 50 acquires the channel information $\tilde{H}_a$ 660 by considering the channel information $H_b$ 676 between the STAb 70 and the STAa 60 and acquired by the STAa 60. Therefore, there is an advantage in that an influence caused by MU-MIMO transmission by the AP 50 is more significantly considered when the STAa 60 receives data through a direct link from the STAb 70 while MU-MIMO transmission is performed by the AP 50.

For this, the STAa 60 acquires the channel information $H_b$ 676 by performing channel estimation by the use of a sounding frame received from the STAb 70. The STAa 60 transmits $U_b^H H_a$ to the AP 50 by the use of a receiving matrix $U_b$ acquired by performing SVD decomposition on the channel information $H_b$ 676. That is, the STAa 60 transmits a steered sounding frame acquired by multiplying the sounding frame by $U_b^H$ so that the AP 50 can acquire channel information $\tilde{H}_a = U_b^H H_a$ 660 by considering data transmission of the STAb 70 through the directly link.

The AP creates a null space in a direction $\tilde{H}_a$ and forms a beam such that it does not act as interference to the STAa 60 (or it has an effect to the minimum extent possible), so as to transmit data to the STA1 10 and the STA2 20 which are targets of MU-MIMO transmission.

Figure 7:
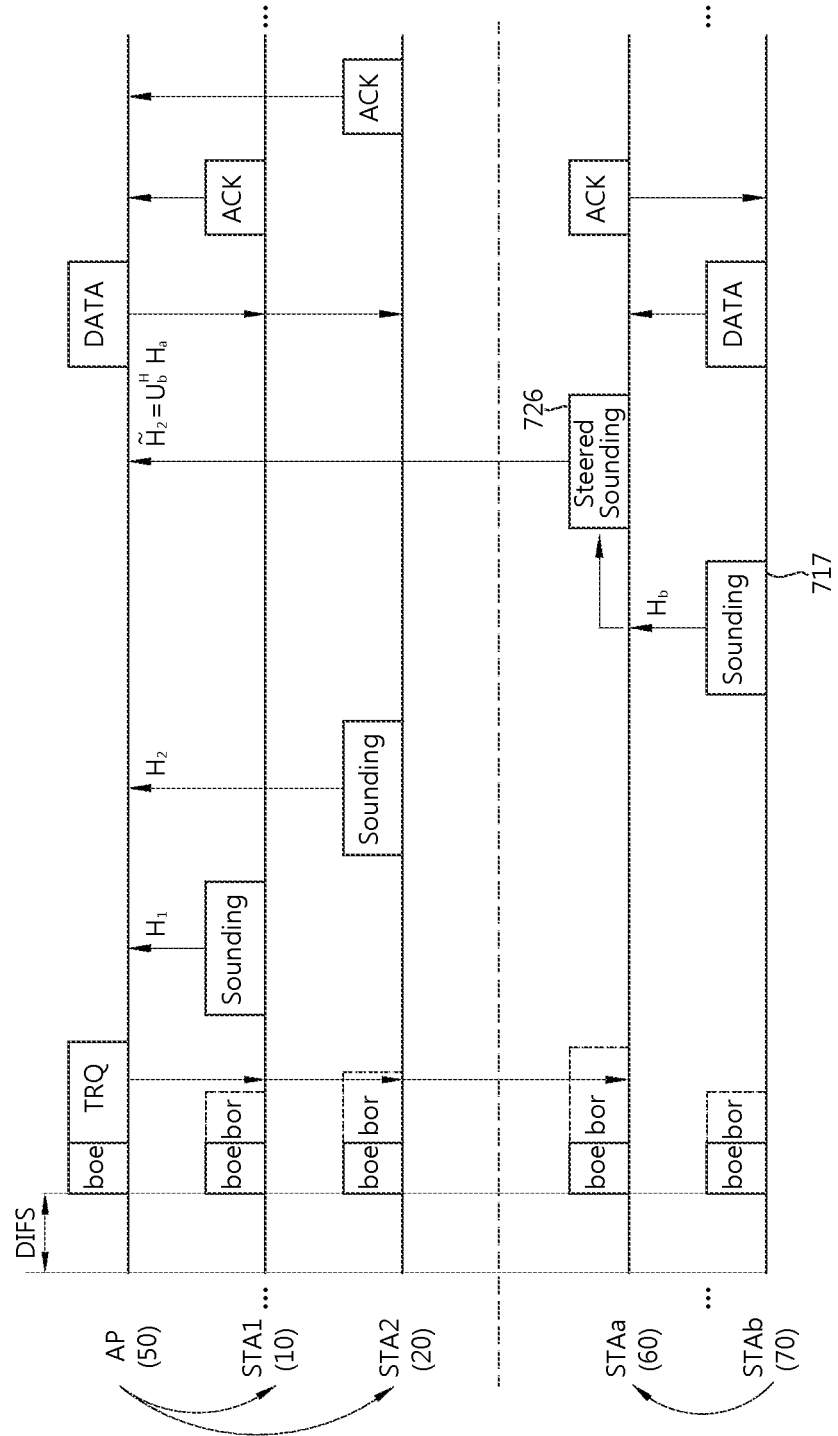
Figure 8:
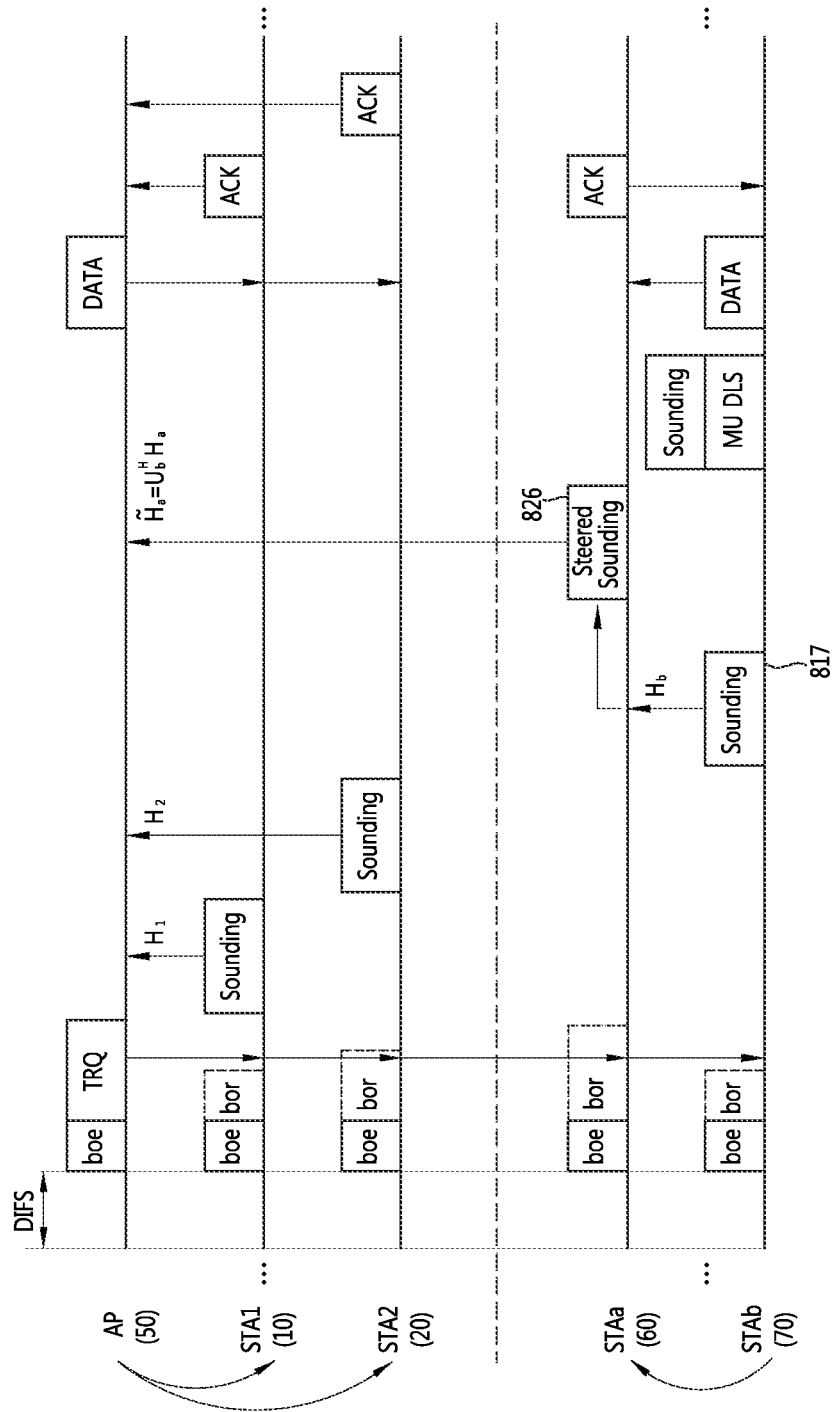
Figure 9:
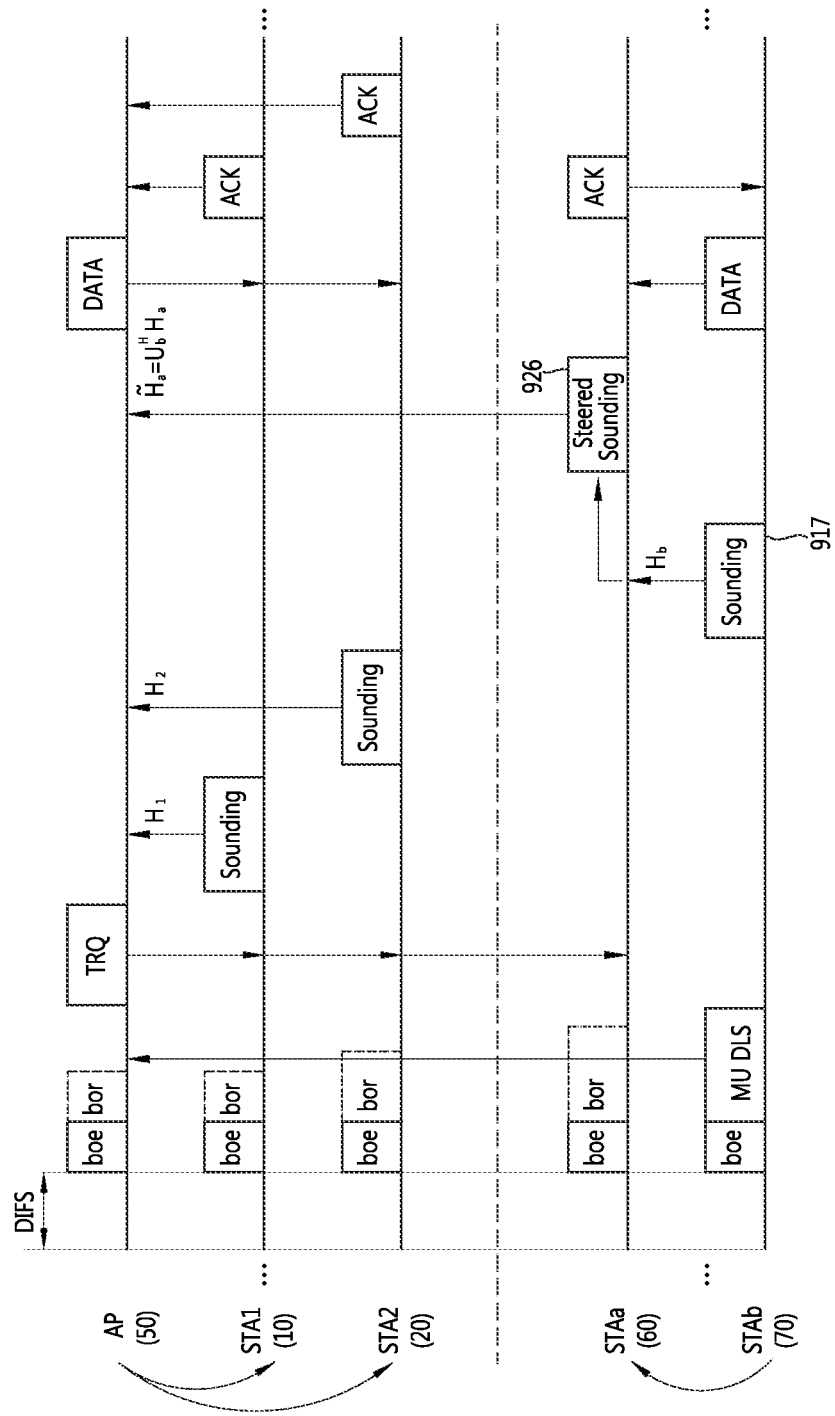

FIG. 7 to FIG. 9 are diagrams showing an interference avoidance method according to another embodiment of the present invention.

Similarly to the embodiment of FIG. 3, FIG. 7 shows an exemplary case where the process is initiated by an AP 50, and the AP 50 knows that an STA for receiving data through a direct link is an STAa 60. A basic process is the same as the case of FIG. 3. However, a sounding frame 326 transmitted by the STAa 60 to the AP 50 in FIG. 3 is replaced with a steered sounding frame 726 in the example of FIG. 7.

The steered sounding frame 726 is transmitted in such a manner that the STAa 60 acquires channel information $H_b$ by using a sounding frame 717 received from the STAb 70 and as described in FIG. 6, beamforming is performed with a receiving matrix acquired by decomposing the channel information $H_b$. Upon receiving the sounding frame 726 steered through such a process, the AP 50 can form a beam for MU-MIMO transmission by considering up to transmission of the STAb 70 for the STAa 60 through the direct link.

Similarly to the embodiment of FIG. 4, FIG. 8 shows an exemplary case where the process is initiated by an AP 50, and the AP 50 does not know whether an STA for receiving data through a direct link is an STAa 60 or an STAb 70. A basic process is the same as the case of FIG. 4. However, similarly to the case of FIG. 7, the STAa 60 transmits a steered sounding frame 826 to the AP 50.

The steered sounding frame 826 is transmitted in such a manner that the STAa 60 acquires channel information $H_b$ by using a sounding frame 817 received from the STAb 70 and as described in FIG. 6, beamforming is performed with a receiving matrix acquired by decomposing the channel information $H_b$. Upon receiving the sounding frame 826 steered through such a process, the AP 50 can form a beam for MU-MIMO transmission by considering up to transmission of the STAb 70 for the STAa 60 through the direct link.

Similarly to the embodiment of FIG. 5, FIG. 9 shows an exemplary case where the process is initiated by an STAb 70. A basic process is the same as the case of FIG. 5. However, similarly to the case of FIG. 7, the STAa 60 transmits a steered sounding frame 926 to the AP 50.

The steered sounding frame 926 is transmitted in such a manner that the STAa 60 acquires channel information $H_b$ by using a sounding frame 917 received from the STAb 70 and as described in FIG. 6, beamforming is performed with a receiving matrix acquired by decomposing the channel information $H_b$. Upon receiving the sounding frame 926 steered through such a process, the AP 50 can form a beam for MU-MIMO transmission by considering up to transmission of the STAb 70 for the STAa 60 through a direct link.

Figure 10:
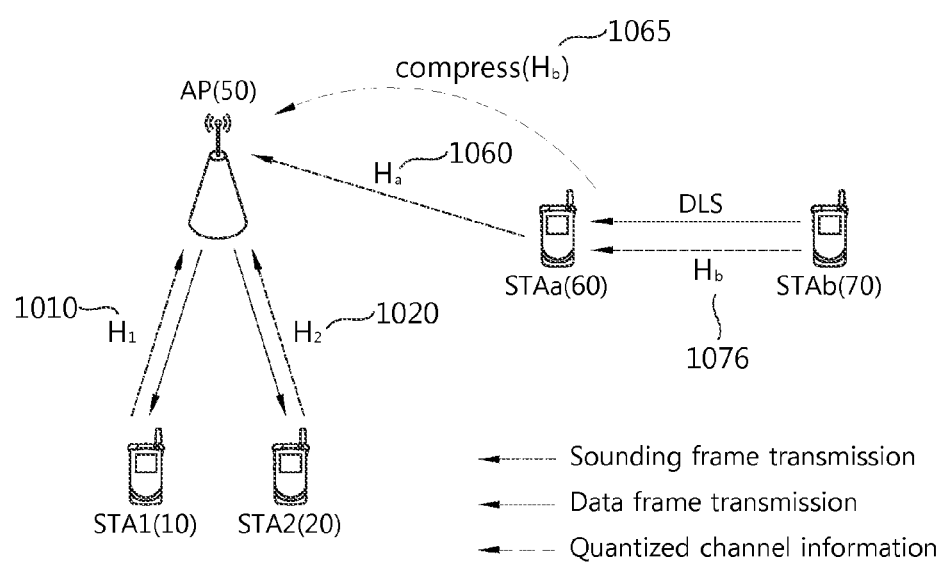
FIG. 10 to FIG. 13 are schematic views showing an interference avoidance method according to a third embodiment of the present invention.

FIG. 10 is a diagram showing an interference avoidance method according to another embodiment of the present invention.

Similarly to the case of FIG. 6, an AP 50 acquires channel information $H_1$ 1010 and channel information $H_2$ 1020 from transmission targets, i.e., an STA1 10 and an STA2 20. Further, the AP 50 acquires channel information $\tilde{H}_a$ 1060 from an STAa 60. In this case, the STAa 60 additionally transmits channel information $H_b$ 1065 between the STAa 60 and the STAb 70 to the AP. The STAa 60 transmits a sounding frame to the AP 50 so that the AP 50 can acquire channel information $H_a$ 1060, and delivers channel information $H_b$ 1076 to the AP 50. The channel information $H_b$ 1076 is acquired by the STAa 60 by receiving the sounding frame from the STAb 70. In this case, the channel information $H_b$ 1076 can be delivered in a format of a covariance of $H_b$ or data obtained by quantizing $H_b$. This is expressed by a compress ($H_b$) 1065 in FIG. 10. Unlike the case of FIG. 6, the STAa 60 transmits a sounding frame to the AP 50 so that the AP 50 can acquire channel information $H_a$ 1060, and the channel information $H_b$ is delivered in the data format, i.e., the compress ($H_b$) 1065.

Through such a process, the AP 50 can acquire channel information between the AP 50 and the STAa 60 and channel information between the STAa 60 and the STAb 70, and can perform MU-MIMO transmission by forming a beam to have a minimum effect on the STAa 60 on the basis of the acquired channel information. Such a method has an advantage in that an influence caused by MU-MIMO transmission by the AP 50 is more significantly considered when the STAa 60 receives data through a direct link from the STAb 70 while MU-MIMO transmission is performed by the AP 50.

Figure 11:
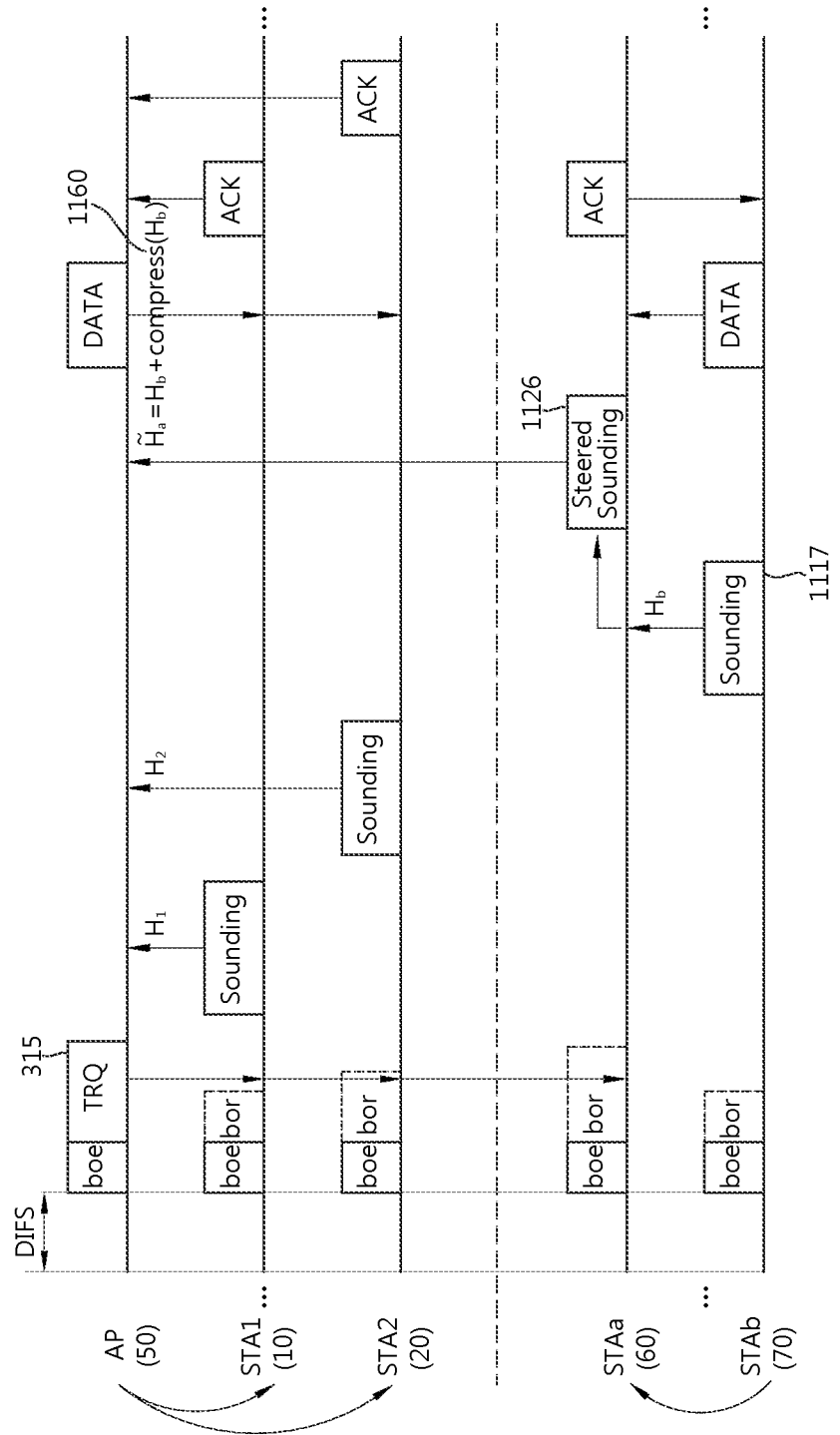
Figure 12:
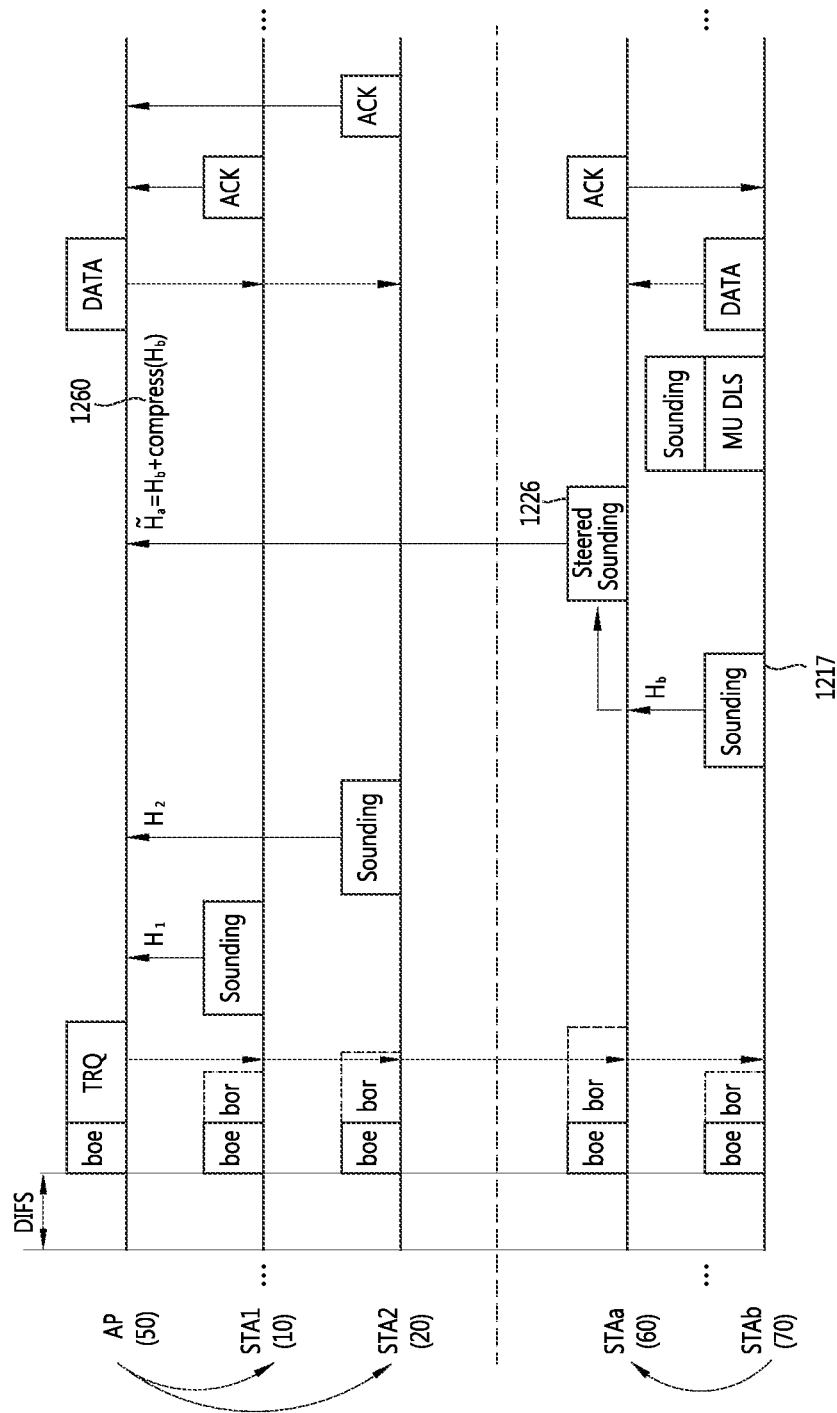
Figure 13:
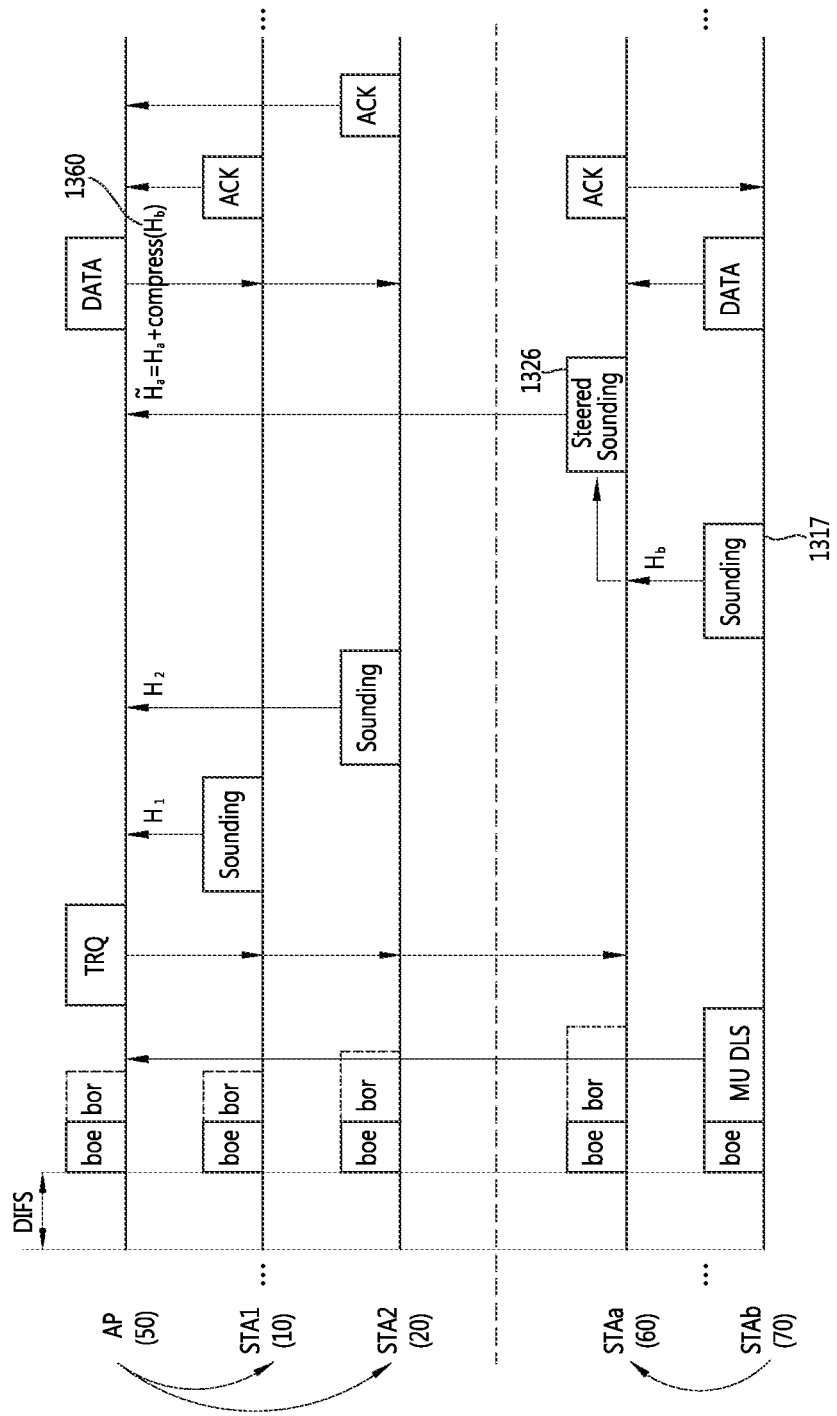

FIG. 11 to FIG. 13 are diagrams showing an interference avoidance method according to another embodiment of the present invention using the channel information transmission method of FIG. 10.

Similarly to the embodiment of FIG. 7, FIG. 10 shows an exemplary case where the process is initiated by an AP 50, and the AP 50 knows that an STA for receiving data through a direct link is an STAa 60. A basic process is the same as the case of FIG. 7. However, unlike the example of FIG. 7, the STAa 60 transmits a sounding frame 1126 to the AP 50, and similarly to the aforementioned channel information delivery method of FIG. 10, transmits channel information $H_b$ in a format of a compress ($H_b$) 1160. Herein, the channel information $H_b$ is channel information acquired by receiving a sounding frame 1117 from the STAb 70.

The AP 50 which receives channel information $\tilde{H}_a$ in this manner can form a beam for MU-MIMO transmission by considering up to transmission of the STAb 70 for the STAa 60 through the direct link.

Similarly to the embodiment of FIG. 8, FIG. 12 shows an exemplary case where the process is initiated by an AP 50, and the AP 50 does not know whether an STA for receiving data through a direct link is an STAa 60 or an STAb 70. A basic process is the same as the case of FIG. 8. However, similarly to the case of FIG. 11, the STAa 60 transmits a sounding frame 1226 to the AP 50, and transmits channel information $H_b$ to the AP 50 in a format of a compress ($H_b$) 1260. Herein, the channel information $H_b$ is acquired by receiving a sounding frame 1217 from the STAb 70. The AP 50 which receives channel information $\tilde{H}_a$ in this manner can form a beam for MU-MIMO transmission by considering up to transmission of the STAb 70 for the STAa 60 through the direct link.

Similarly to the embodiment of FIG. 9, FIG. 13 is an exemplary case where the process is initiated by the STAb 70. A basic process is the same as the case of FIG. 9. However, similarly to the case of FIG. 11, the STAa 60 transmits a sounding frame 1226 to the AP 50, and transmits channel information $H_b$ to the AP 50 in a format of a compress ($H_b$) 1360. Herein, the channel information $H_b$ is acquired by receiving a sounding frame 1317 from the STAb 70. The AP 50 which receives channel information $\tilde{H}_a$ in this manner can form a beam for MU-MIMO transmission by considering up to transmission of the STAb 70 for the STAa 60 through a direct link.

Figure 14:
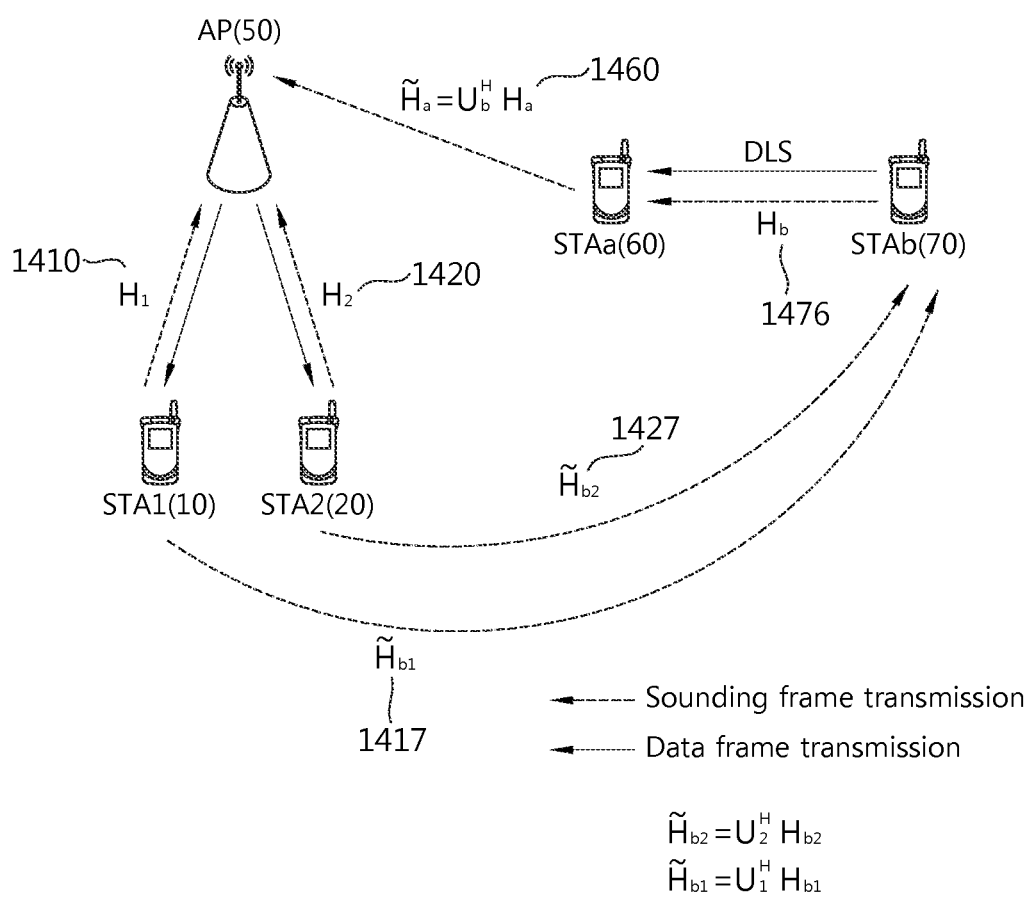
FIG. 14 to FIG. 17 are schematic views showing an interference avoidance method according to a fourth embodiment of the present invention.

FIG. 14 is a schematic view of an interference avoidance method according to another embodiment of the present invention. The interference avoidance method of FIG. 14 is a method in which channel information between STAs receiving data through MU-MIMO transmission and STAs receiving data through a direct link is further considered as an element which may act as interference to the STAs receiving the data through the direct link when MU-MIMO transmission and DL transmission are achieved simultaneously.

The interference avoidance method of FIG. 14 is the same as the interference avoidance method of FIG. 6 except that an STAb 70 acquires channel information by receiving a sounding frame from an STA1 10 and STA2 20 for receiving data through MU-MIMO transmission, and considers the channel information in beamforming for data transmission through the direct link. That is, a beam is formed such that data transmission through the directly link of the STAb 70 has a less effect on the STA1 10 and STA2 20 for receiving the data through MU-MIMO transmission, and the beam is transmitted through DL transmission. That is, in addition to the steps of the method of FIG. 6, the interference avoidance method of FIG. 14 is a method of further including a step in which the STAb 70 acquires channel information $\tilde{H}_{b1}$ 1417 and channel information $\tilde{H}_{b2}$ 1427 by receiving a sounding frame from the STA1 10 and the STA2 20.

The STA1 10 and the STA2 20 transmit a steered sounding frame to the STAb 70 so that the STAb 70 can acquire channel information $\tilde{H}_{b1}$ 1417 and channel information $\tilde{H}_{b2}$ 1427.

The channel information $\tilde{H}_{b1}$ 1417 is acquired by multiplying a channel matrix $H_{b1}$ between the STA1 10 and the STAb 70 by a receiving matrix $U_1^H$ acquired through SVD-decomposition of the a channel matrix $H_1$ between the AP 50 and the STA1 10. Likewise, the channel information $\tilde{H}_{b2}$ 1427 is acquired by multiplying a channel matrix $H_{b2}$ between the STA2 20 and the STAb 70 and a channel matrix $H_2$ between the AP 50 and the STA2 20 by a receiving matrix $U_2^H$ acquired through SVD-decomposition of a channel matrix $H_2$ between the AP 50 and the STA2 20. In other words, the STA1 10 transmits to the STAb 70 a steered sounding frame which is precoded with $U_1^H$ and the STA2 20 transmits to the STAb 70 a steered sounding frame which is precoded with $U_2^H$, so that it can be considered when the STAb 70 transmits data to the STAa 60 through the direct link.

From the perspective of the AP 50, in addition to a channel between the AP 50 and the STA1 10 and a channel between the AP 50 and the STA2 20, a beam to be transmitted to the STA1 10 and the STA2 20 can be formed by acquiring an effective channel $\tilde{H}_a$ in consideration of an influence of a channel $H_b$ between the STAb 70 and the STAa 60.

Figure 15:
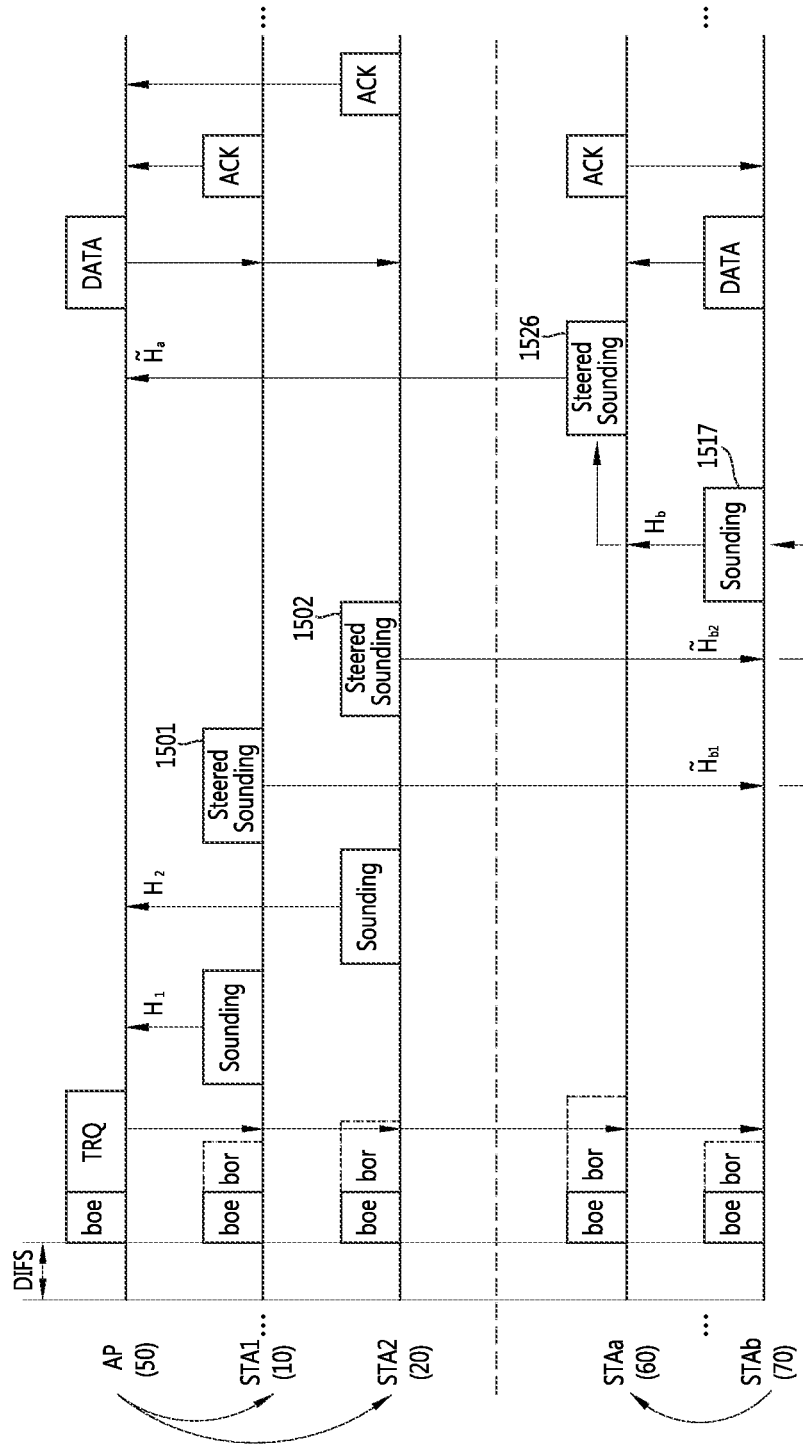
Figure 16:
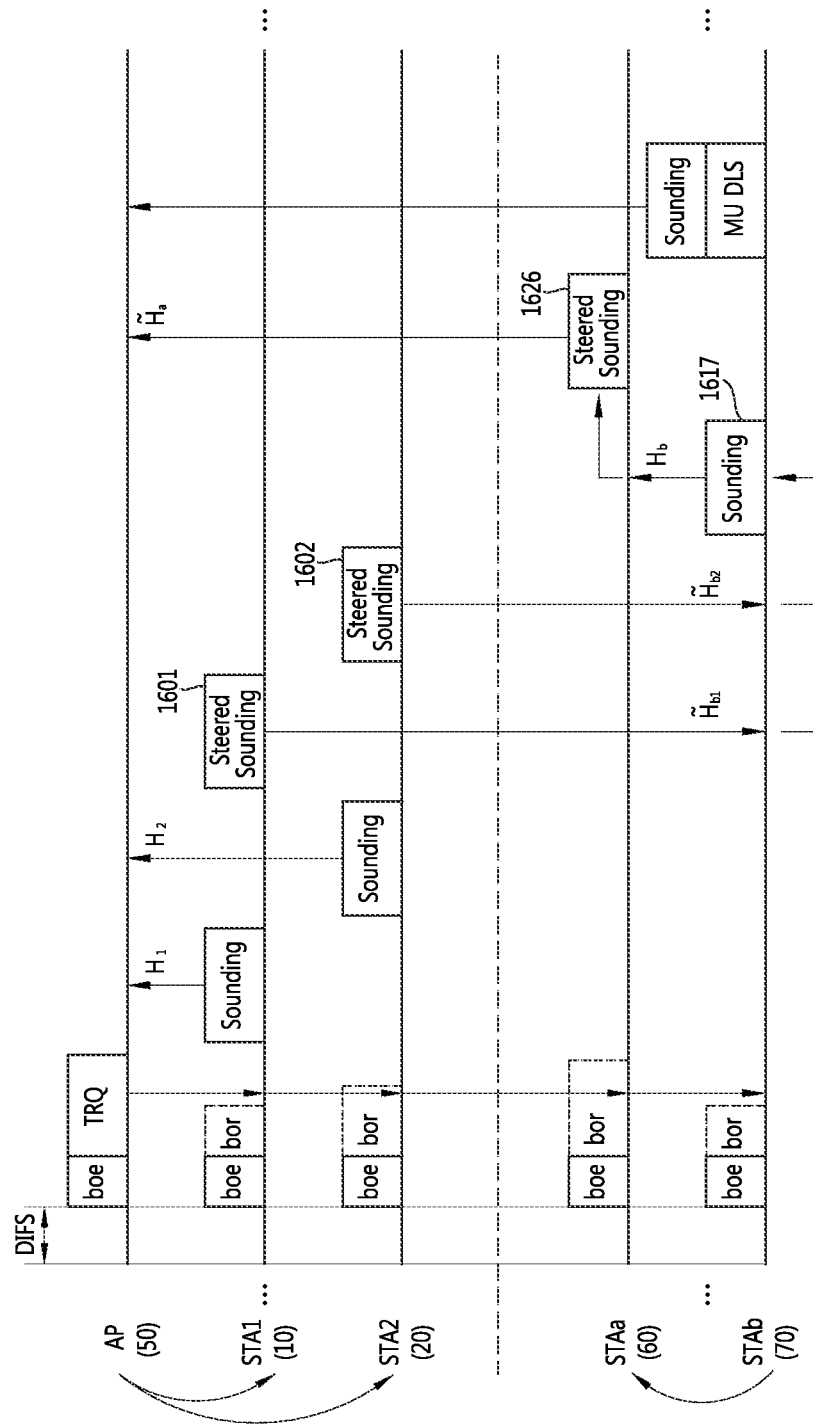
Figure 17:
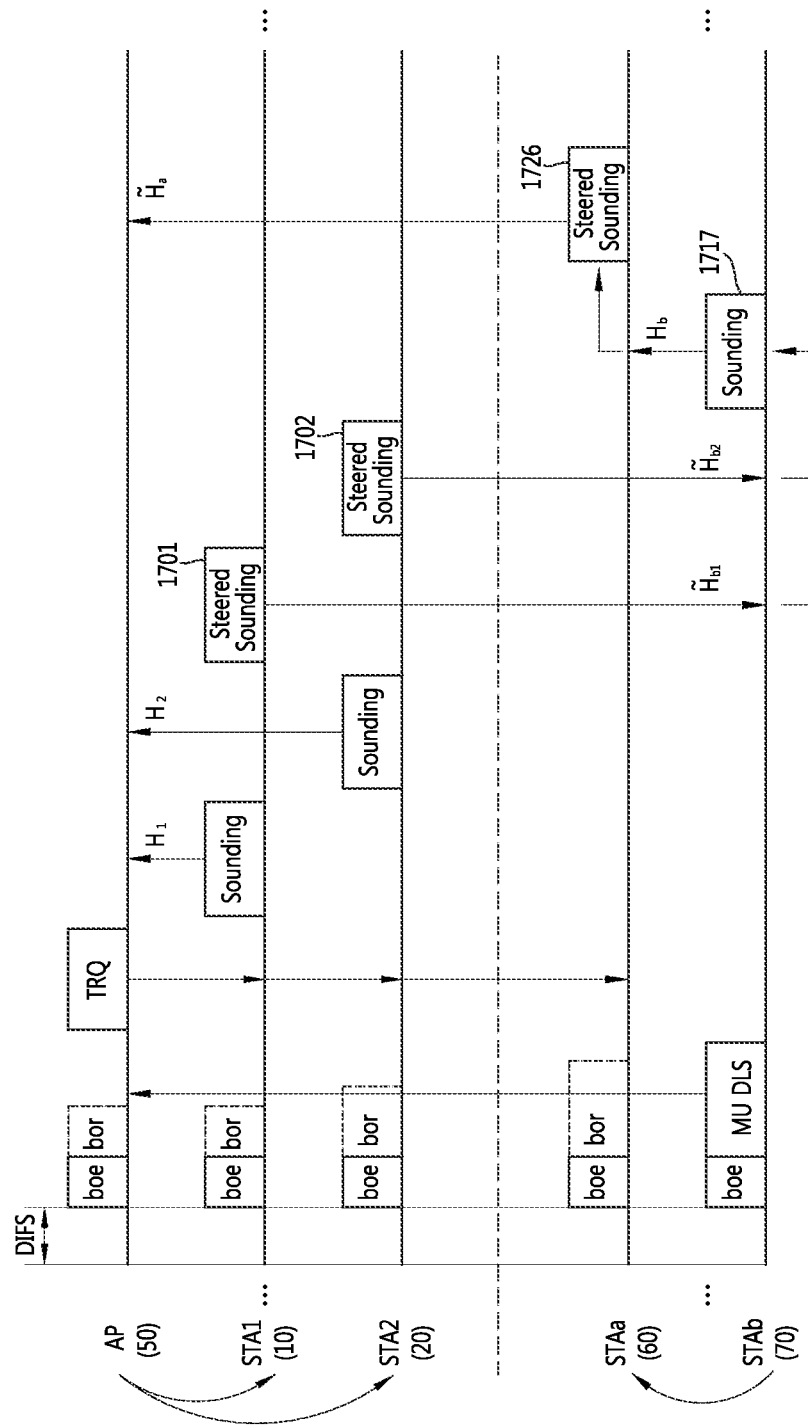

FIG. 15 to FIG. 17 show examples of applying the interference avoidance method of FIG. 14.

FIG. 15, FIG. 16, and FIG. 17 have the same basic processes as those of FIG. 7, FIG. 8, and FIG. 9, respectively. However, in FIG. 15, an STA1 10 transmits a steered sounding frame 1501 to an STAb 70, and an STA2 20 transmits a steered sounding frame 1502 to an STAb 70, so that the STAb 70 can acquire channel information $\tilde{H}_{b1}$ and channel information $\tilde{H}_{b2}$ to be considered in DL transmission.

Likewise, in FIG. 16, a process in which the STA1 10 transmits a steered sounding frame 1601 to the STAb 70 and in which the STA2 20 transmits a steered sounding frame 1602 to the STAb 70 is further added to the embodiment of FIG. 8 so that the STAb 70 can acquire channel information $\tilde{H}_{b1}$ and channel information $\tilde{H}_{b2}$ to be considered in DL transmission. In FIG. 17, a process in which the STA1 10 transmits a steered sounding frame 1701 to the STAb 70 and in which the STA2 20 transmits a steered sounding frame 1702 to the STAb 70 is further added to the embodiment of FIG. 9 so that the STAb 70 can acquire channel information $\tilde{H}_{b1}$ and channel information $\tilde{H}_{b2}$ to be considered in DL transmission.

The embodiment of FIG. 14 and the interference avoidance method/process of FIG. 15 to FIG. 17 which are implemented for each situation allow the AP 50 to acquire an effective channel $\tilde{H}_a$ of the STAa 60 for receiving data through a direct link so as to be considered in beamforming for MU-MIMO transmission, and also allow the STA1 10 and the STA2 20 which are targets of MU-MIMO transmission to transmit their effective channel information $\tilde{H}_{b1}$ and $\tilde{H}_{b2}$ to the STAb 70 for transmitting data through the direct link so that the STAb 70 considers the information in data transmission through the direct link. Therefore, the STAa 60 is less affected by MU-MIMO transmission of the AP 50, and the STA1 10 and the STA2 20 are also less affected by DL transmission.

Figure 18:
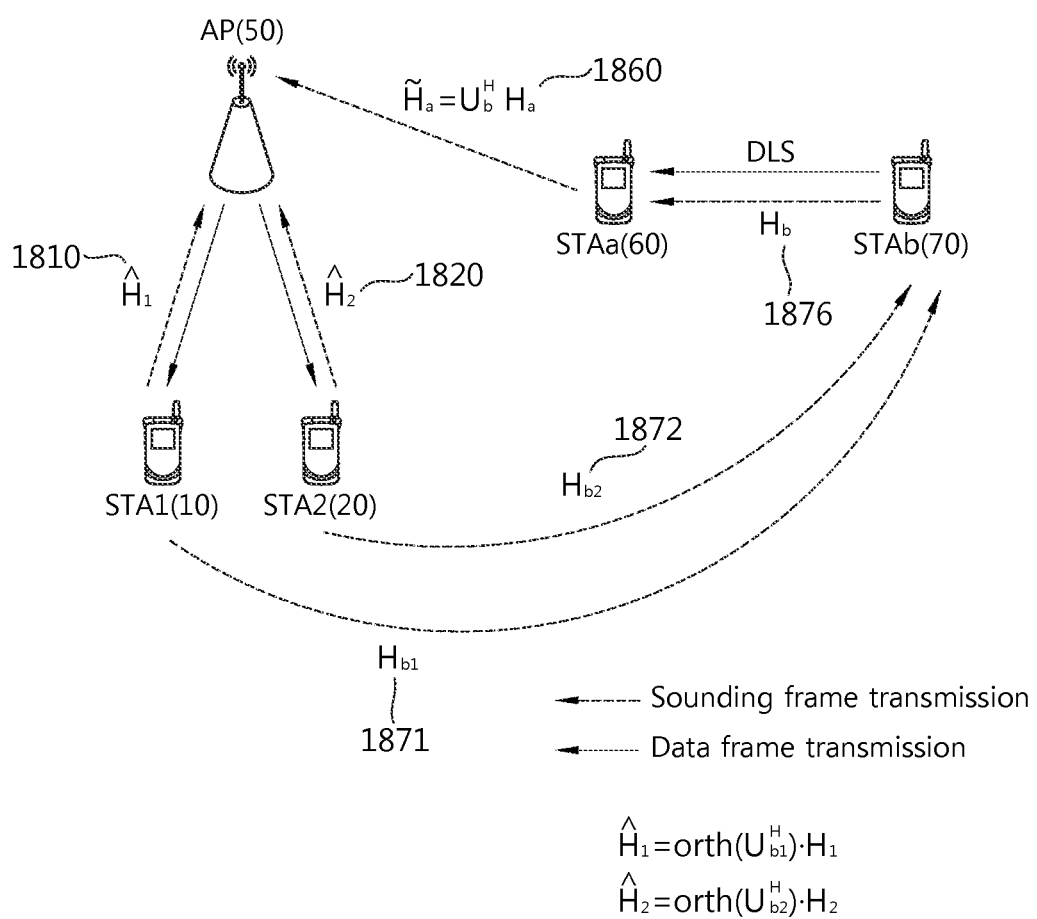
FIG. 18 to FIG. 21 are schematic views showing an interference avoidance method according to a fifth embodiment of the present invention.

FIG. 18 is a schematic view of an interference avoidance method according to another embodiment of the present invention. The interference avoidance method of FIG. 18 has the same basic process as the interference avoidance method of FIG. 6. That is, an AP 50 acquires channel information by receiving a sounding frame from an STA1 10 and an STA2 20 which are targets of MU-MIMO transmission. Further, the AP 50 receives a sounding frame from an STAa 60 for receiving data through a direct link, forms a beam which is steered such that MU-MIMO transmission has a less effect on the STAa 60, and transmits data to the STA1 10 and the STA2 20.

In this case, all of the STA1 10, the STA2 20, and the STAa 60 transmit steered sounding frames to the AP 50. The steered sounding frame transmitted by the STAa 60 is precoded with a receiving matrix $U_b^H$ acquired through decomposition of channel information $H_b$ acquired by using the sounding frame received from the STAb 70. $U_b^H$ indicates information regarding a null space direction from the perspective of the AP 50. Accordingly, the AP 50 can acquire effective channel information $\tilde{H}_a$ of the STAa 60. The AP 50 may use $\tilde{H}_a$ to form a beam not to have an effect on the STAa 60.

The STA1 10 and the STA2 20 receive a sounding frame from the STAb 70, and perform channel estimation by using the received sounding frame to acquire channel information $H_{b1}$ 1871 and channel information $H_{b2}$ 1872. The STA1 10 and the STA2 20 acquire receiving matrices $U_{b1}^H$ and $U_{b2}^H$ by decomposing each of the acquired channel information $H_{b1}$ 1871 and channel information $H_{b2}$ 1872. The STA1 10 and the STA2 20 acquire a precoding matrix such that DL transmission for the STAb 70 for the STAa 60 has a less effect on MU-MIMO transmission of the AP 50 on the basis of the receiving matrices $U_{b1}^H$ and $U_{b2}^H$, and transmit a steered precoded sounding frame so that the AP 50 can acquire channel information $\hat{H}_1$ and $\hat{H}_2$.

In the example of FIG. 18, the STA1 10 transmits a steered sounding frame by multiplying the receiving matrices $U_{b1}^H$ and $U_{b2}^H$ respectively by orthogonal matrices orth($U_{b1}^H$) and orth($U_{b2}^H$). However, according to an embodiment, if it cannot be transmitted with an orthogonal matrix, the frame can be transmitted by being precoded with a similar matrix.

Figure 19:
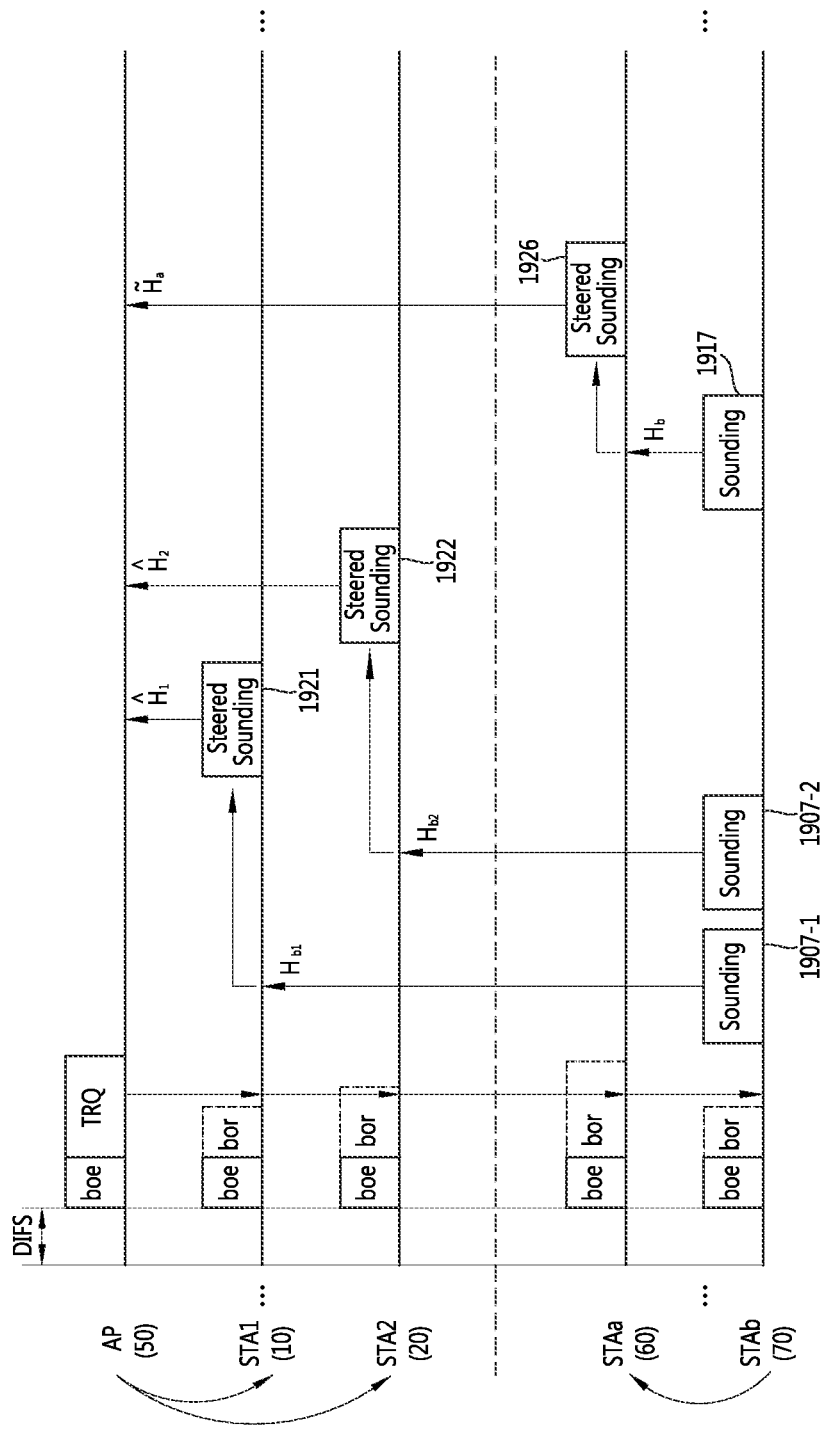
Figure 20:
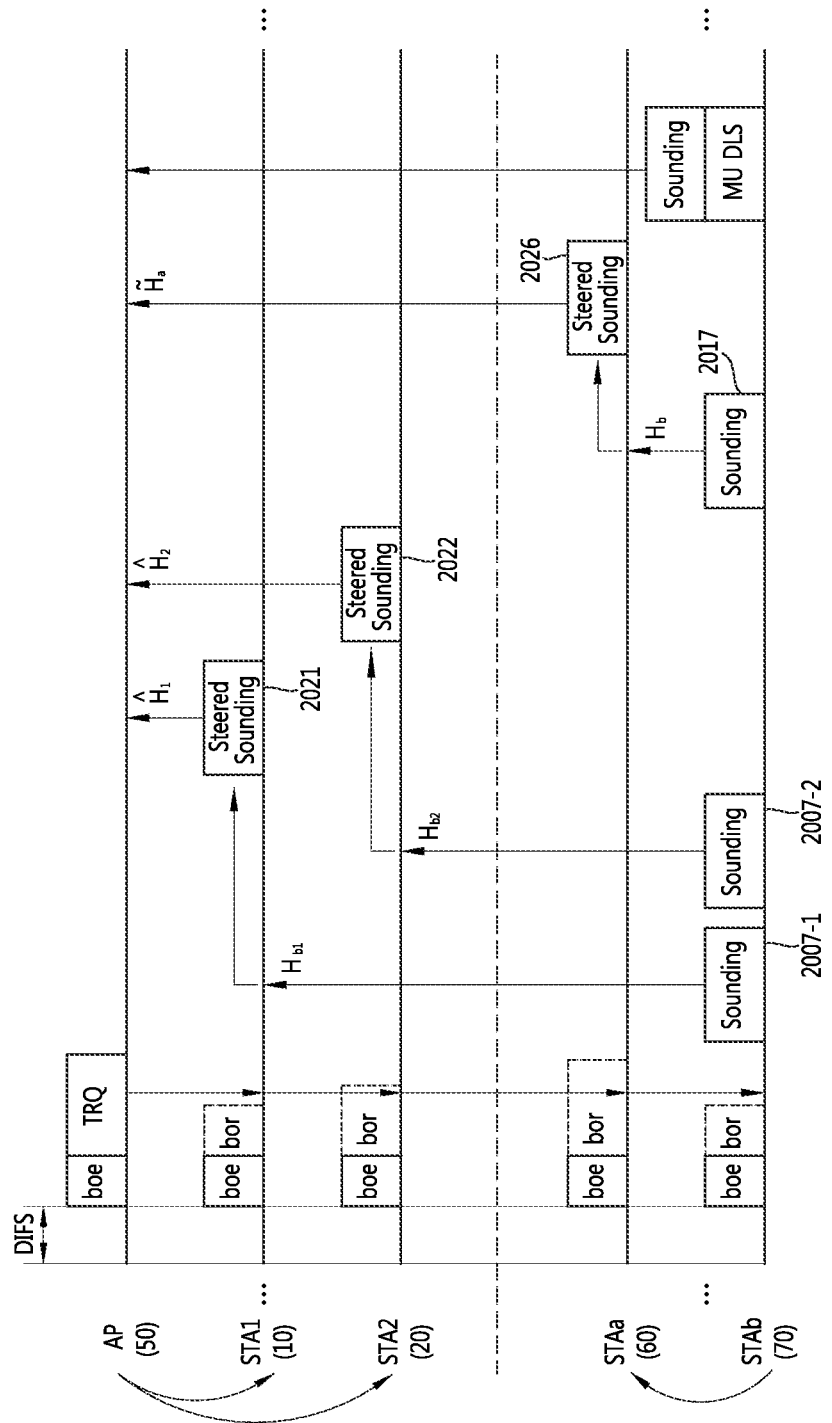
Figure 21:
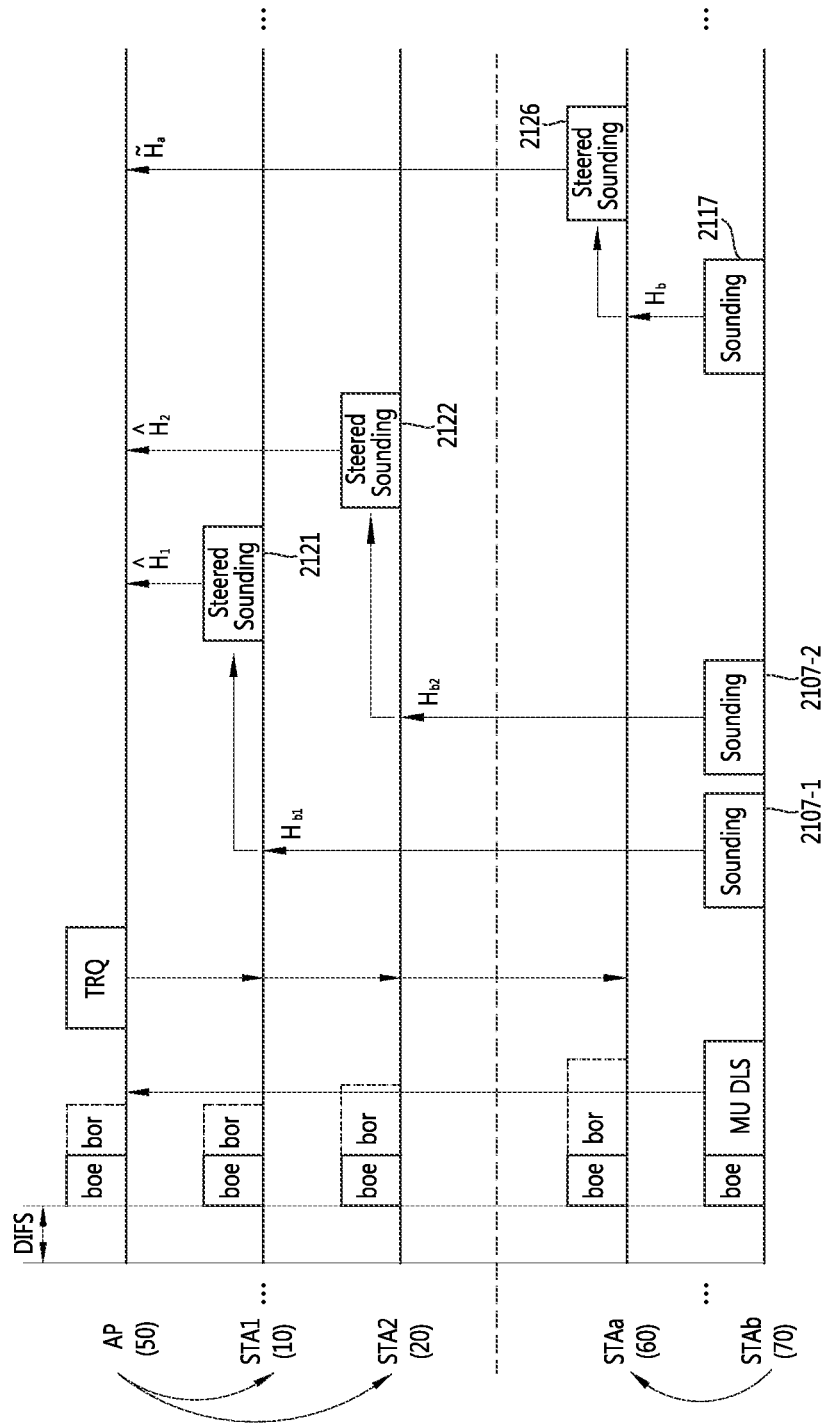

FIG. 19 to FIG. 21 show examples in which the example of FIG. 18 can apply to a case where the process is initiated by an AP 50 and the AP 50 knows an STA for receiving data through the direct link, a case where the process is initiated by the AP 50 and the AP 50 does not know an STA for receiving data through a directly link, and a case where the process is initiated by an STA and the AP 50 does not know an STA for receiving data through the direct link.

The embodiments of FIG. 19 to FIG. 21 are the same as the embodiments of FIG. 7 to FIG. 9 in general except that a sounding frame transmitted by the STA1 10 and the STA2 20 to the AP 50 is replaced with a steered sounding frame, and the AP 50 acquires channel information $\hat{H}_1$ and $\hat{H}_2$ through the steered sounding frame. In addition, a process of receiving sounding frames (i.e., sounding frames 1907-1 and 1907-2 of FIG. 19, sounding frames 2007-1 and 2007-2 of FIG. 20, and sounding frames 2107-1 and 2107-2 of FIG. 21) by the STA1 10 and the STA2 20 from the STAb 70 is further included for transmission of the steered sounding frame.

That is, in the embodiments of FIG. 19 to FIG. 21, the STA1 10 and the STA2 20 receive a sounding frame from the STAb 70 to acquire channel information (i.e., a channel matrix) with the STAb 70, and transmits to the AP 50 a steered sounding frame which is precoded with a receiving matrix acquired by decomposing the channel information, so that the AP 50 can acquire effective channel information of the STA1 10 and the STA2 20.

In order to transmit the effective channel information in the aforementioned method, it is possible to apply a method of sending a sounding frame together with channel information having a data format as shown in the embodiment of FIG. 10 instead of transmitting a steered sounding frame.

In a situation of FIG. 1 capable of applying the aforementioned interference avoidance method according to the present invention, the STAa is interfered when MU-MIMO data is transmitted to the STA1 and the STA2, and the STA1 and the STA2 are interfered when the STAb performs DL transmission to the STAa. In order to decrease interference existing between MU-MIMO and DLS, the number of antennas of a transmitting STA (i.e., a transmitter) for forming a beam must be greater than the number of antennas of a receiving STA (i.e., a receiver) in the aforementioned various embodiments. This is because interference acting on other STAs except for an STA intending to transmit data can be decreased only when a null space dimension is sufficient in addition to a beam-forming dimension for data transmission. However, in reality, the STA cannot have a relatively great number of antennas as in the AP. That is, from the perspective of the STAa, there is a high possibility that a null space dimension for decreasing interference acting on the STA1 and the STA2 may be insufficient.

To solve such a problem, the number of spatial streams used by an STA operating in DLS can be limited to 1 according to the embodiment of the present invention. In addition, the number of spatial streams transmitted with MU-MIMO can also be limited. The limitation on the number of spatial streams used in MU-MIMO and DL transmissions can be steered according to whether interference acting on the STA1 and the STA2 by the STAb significantly deteriorates performance and whether interference acting on the STAa by the AP significantly causes performance deterioration.

Figure 22:
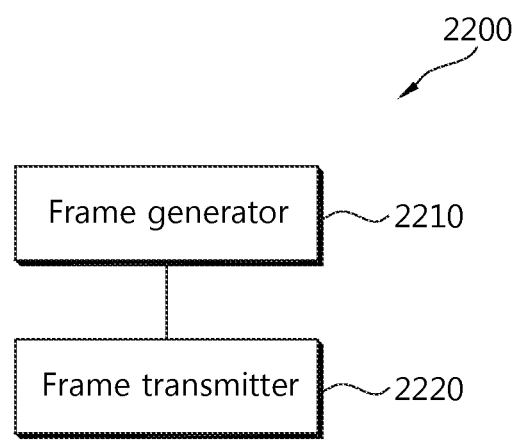
FIG. 22 is a block diagram showing a wireless apparatus according to an embodiment of the present invention.

FIG. 22 is a block diagram showing a wireless apparatus according to an embodiment of the present invention. A wireless apparatus 2200 may be an AP, a PCP, or a non-AP/non-PCP STA.

The wireless apparatus 2200 includes a processor 2210, a memory 2220, and a transceiver 2230. The transceiver 2230 transmits/receives a radio signal, and implements an IEEE 802.11 physical layer. The processor 2210 is coupled to the transceiver 2230, and implements an IEEE 802.11 MAC layer. When the processor 2210 handles an operation of the AP/PCP among the aforementioned methods, the aforementioned apparatus 2200 is the AP/PCP. When the processor 2210 handles an operation of the non-AP/non-PCP STA among the aforementioned methods, the wireless apparatus 2200 is the non-AP/non-PCP STA. The processor 2210 and/or the transceiver 2230 may include an application-specific integrated circuit (ASIC), a separate chipset, a logic circuit, and/or a data processing unit. The memory 2220 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 2220 and may be performed by the processor 2210. The memory 2220 may be located inside or outside the processor 2210, and may be coupled to the processor 2210 by using various well-known means.

Various modifications may be made in the aforementioned embodiments. Although all possible combinations of the various modifications of the embodiments cannot be described, those ordinary skilled in that art will understand possibility of other combinations. Therefore, the present invention is not intended to be limited to the embodiments shown herein but is to be accorded the widest scope consistent with the principles and novel features disclosed herein.

The invention claimed is:

1. An interference avoidance method performed by an access point (AP) in a wireless local area network (WLAN) system, the method comprising:
transmitting a training request (TRQ) message for requesting transmission of a sounding frame to a first station which is a target of multi-user multiple input multiple output (MU-MIMO) transmission, a second station which receives data through a direct link during the MU-MIMO transmission, and a third station which transmits data through a direct link;
receiving first and second sounding frames respectively transmitted by the first and second stations in response to the TRQ message;
receiving from the third station a sounding frame and a multi-user direct link setup (MU DLS) frame including a station identifier (STA ID) field indicating a transmitting station which transmits data by the third station to the second station through the direct link;
estimating a channel by using the first sound frame to determine a beam-forming vector to be used for the MU-MIMO transmission; and
performing the MU-MIMO transmission for MU-MIMO transmission target stations,
wherein the beam-forming vector is determined such that the MU-MIMO transmission has a minimum effect on the second station by considering channel information between the AP and the second station and acquired on the basis of the second sounding frame received from the second station, and
wherein the MU DLS frame further includes at least one of a multi-TID field indicating quality of service (QoS) information of data transmitted by the third station to the second station, a start offset field indicating a time at which the third station starts to transmit the data to the second station through the direct link, and a duration field indicating a duration in which the third station transmits the data to the second station through the direct link.

2. The method of claim 1, wherein the second sounding frame is a steered sounding frame which is precoded with a receiving matrix acquired by the second station by using a third sounding frame received from the third station for transmitting data to the second station through the direct link.

3. The method of claim 1, wherein the third sounding frame includes channel information between the third station and the first station.

4. The method of claim 1, wherein the first sounding frame includes channel information between the third station and the first station.

5. The method of clam 1, wherein the second station transmits channel information between the second station and the third station for transmitting data to the second station through the direct link together with the second sounding frame as quantized data.

6. The method of claim 5, wherein the channel information transmitted with the quantized data is acquired on the basis of a receiving matrix acquired by using a third sounding frame received from the third station.

7. A station comprising:
a processor; and
a transceiver operatively coupled to the processor and configured to transmit and receive a frame, wherein the processor is further configured to:
- transmit a training request (TRQ) message for requesting transmission of a sounding frame to a first station which is a target of multi-user multiple input multiple output (MU-MIMO) transmission, a second station which receives data through a direct link during the MU-MIMO transmission, and a third station which transmits data through a direct link;
- receive first and second sounding frames respectively transmitted by the first and second stations in response to the TRQ message;
- receive from the third station a sounding frame and a multi-user direct link setup (MU DLS) frame including a station identifier (STA ID) field indicating a transmitting station which transmits data by the third station to the second station through the direct link
- estimate a channel by using the first sound frame to determine a beam-forming vector to be used for the MU-MIMO transmission; and
- perform the MU-MIMO transmission for MU-MIMO transmission target stations, wherein the beam-forming vector is determined such that the MU-MIMO transmission has a minimum effect on the second station by considering channel information between an access point (AP) and the second station and acquired on the basis of the second sounding frame received from the second station, and wherein the MU DLS frame further includes at least one of a multi-TID field indicating quality of service (QoS) information of data transmitted by the third station to the second station, a start offset field indicating a time at which the third station starts to transmit the data to the second station through the direct link, and a duration field indicating a duration in which the third station transmits the data to the second station through the direct link.

* * * * *